(12) United States Patent
Pierce et al.

(10) Patent No.: US 11,645,560 B2
(45) Date of Patent: May 9, 2023

(54) PROCESSING IN-CONTENT CHALLENGES FOR ONLINE GAMING SYSTEMS

(71) Applicant: Versus LLC, Los Angeles, CA (US)

(72) Inventors: Matthew Dalton Pierce, Culver City, CA (US); Jon Alexander Peachey, Las Vegas, NV (US)

(73) Assignee: Versus LLC, Los Angeles, CA (US)

( * ) Notice: Subject to any disclaimer, the term of this patent is extended or adjusted under 35 U.S.C. 154(b) by 0 days.

(21) Appl. No.: 17/198,187

(22) Filed: Mar. 10, 2021

(65) Prior Publication Data
US 2021/0283512 A1   Sep. 16, 2021

Related U.S. Application Data

(60) Provisional application No. 62/988,291, filed on Mar. 11, 2020.

(51) Int. Cl.
| | |
|---|---|
| *G06N 5/04* | (2023.01) |
| *A63F 13/35* | (2014.01) |
| *G06N 20/00* | (2019.01) |
| *A63F 13/46* | (2014.01) |
| *A63F 13/798* | (2014.01) |

(52) U.S. Cl.
CPC ............... *G06N 5/04* (2013.01); *A63F 13/35* (2014.09); *A63F 13/46* (2014.09); *A63F 13/798* (2014.09); *G06N 20/00* (2019.01)

(58) Field of Classification Search
CPC ........ A63F 13/46; A63F 13/798; A63F 13/35; A63F 13/795
See application file for complete search history.

(56) References Cited

U.S. PATENT DOCUMENTS

| | | | |
|---|---|---|---|
| 10,242,538 B2 | 3/2019 | Pierce et al. | |
| 10,580,043 B2 * | 3/2020 | Publicover | ............... H04W 4/21 |
| 10,789,816 B2 | 9/2020 | Pierce et al. | |
| 10,848,805 B1 * | 11/2020 | Mattar | ............ H04N 21/47202 |
| 10,888,789 B2 | 1/2021 | Pierce et al. | |
| 2009/0209351 A1 * | 8/2009 | Umaki | .................... A63F 13/00 |
| | | | 463/42 |

(Continued)

*Primary Examiner* — Seng H Lim
(74) *Attorney, Agent, or Firm* — Fenwick & West LLP

(57) ABSTRACT

An in-content challenge platform generates dynamic content for interactive media applications, for example, online games. The system presents dynamic content in connection with interactive media applications. The in-content challenge platform receives in-content challenge criteria based on actions performed by users in interactive media applications. The in-content challenge platform receives event data indicating actions performed by the user within the online game and identifies an in-content challenge associated with the action. And determines whether any in-content challenge is met by the user based on the actions. If the user meets an in-content challenge, the platform dynamically generates content for sending to the user. The system uses artificial intelligence techniques including symbolic artificial intelligence, unsupervised machine learning techniques, and supervised machine learning techniques for generating dynamic content. The system stores symbolic expressions representing constraints and content items and use an inference engine to determine whether content items satisfy constraints.

20 Claims, 15 Drawing Sheets

(56) References Cited

U.S. PATENT DOCUMENTS

| | | | |
|---|---|---|---|
| 2010/0009750 A1* | 1/2010 | Egozy | A63F 13/005 |
| | | | 463/35 |
| 2012/0244948 A1* | 9/2012 | Dhillon | A63F 13/61 |
| | | | 463/42 |
| 2013/0116044 A1* | 5/2013 | Schwartz | A63F 13/73 |
| | | | 463/29 |
| 2013/0165229 A1* | 6/2013 | Park | G07F 17/3225 |
| | | | 463/40 |
| 2013/0331162 A1* | 12/2013 | Krivicich | A63F 13/426 |
| | | | 463/9 |
| 2014/0164037 A1* | 6/2014 | Rao | G06Q 30/0207 |
| | | | 705/7.13 |
| 2015/0287339 A1* | 10/2015 | Deshmukh | G09B 19/04 |
| | | | 434/156 |
| 2015/0328543 A1* | 11/2015 | Lee | A63F 13/497 |
| | | | 463/42 |
| 2019/0340579 A1* | 11/2019 | Krystek | G06Q 10/02 |
| 2020/0349611 A1* | 11/2020 | Publicover | H04N 21/6582 |
| 2021/0146239 A1* | 5/2021 | Hiatt | A63F 13/35 |

\* cited by examiner

810

Prizing Platform | Change Platform ▼

Add a New Sweepstake Prize — CANCEL | SAVE

XXX.TACOBRAN...▼
- Brand Report
- Prizes
- Campaigns
- Sweepstakes

Sweepstakes Prize Information

| | |
|---|---|
| Display Name | Taco Brand $50 Gift Card |
| Internal Name | Program.March2020  24/30 |
| Description | This sweepstake prize is sponsored by Versus Systems. Tacos! All the time! 2019 Taco Brand IP Holder, LLC. |

Prize Images

Only PNG images are supported. You can upload a max of 2 additional images. The logo and primary image are immediately viewable the user; any additional images are seen when viewing more details about the prize.

[logo] [gift card] [x image] [+ Add Image]

Prize Details

| | |
|---|---|
| Brand | XXX.TACOBRAND.TESTONLY |
| Prize Category | General Prize |
| Prize Type | Physical Good ▼ |
| Product Family | Gift Card ▼  ☐ Add new product family |
| SKU | (optional) |
| MSRP (Price) | $50.00  ☐ Display MSRP in game |
| Created by | Christian Miranda |
| Date created | 11/25/2019 |

Win Limits

- ⦿ No win limits
- ○ ___ times ever

Summary: This prize has no win limits

Inventory Information

Generate Inventory

| | |
|---|---|
| Token Format ⓘ | Text ▼ |
| Fulfillment Method ⓘ | email ▼ |
| Upload File | 📎 Upload File |
| Redemption Procedure | Describe how this item can be redeemed so the player can follow the instructions and redeem the item |

| Prizing Platform | | Change Platform ▼ |

Add a Campaign — ① Setup — ② Targeting — CANCEL — NEXT STEP

XXX.TACOBRAN... ▼

- Brand Report
- ᛉ Prizes
- ▭ Campaigns
- ▦ Sweepstakes

Campaign Information

| | |
|---|---|
| Campaign Name | Taco Brand $5 Gift Card |
| Description | This sweepstake prize is sponsored by Versus Systems. Tacos! All the time! |
| Start Date | 05/12/2020   12:30 PM |
| End Date | 10/10/2020   12:00 PM |
| Timezone County | United States ▼ |
| Timezone | Pacific Time ▼ |

Inventory Information

Generate Inventory

| | |
|---|---|
| Token Format ⓘ | Text ▼ |
| Fulfillment Method ⓘ | email ▼ |
| Upload File | 🖉 Upload File |
| Redemption Procedure | Congratulations! You've won a Taco Brand $5 Gift Card<br/>To claim one (1) Taco Brand Gift Card:\<br /><br/>-\<a href='https://www.mywinfinite.com/winfinite-q4-giftcards'\> Click here for Gift Card Redemption Form \</a\>\<br /><br/>-Copy the ten (10) digit code and paste it in Gift Card Redemption Form\<br /><br/>-Select \<b\> Taco Brand $5 Gift Card\</b\> from dropdown menu\<br /><br/>-Make sure to use the email associated to your Winfinite Account to redeem your prize\<br /\>\<br /\>\<br /\> |

NEXT STEP

| Prizing Platform | Change Platform ⌄ |

| Add a Campaign | ⊘ Setup | ② Targeting | BACK | SAVE |

Target by Game

Select the games you would like this campaign to specifically be targeted in.

- ☐ NASCAR Heat Mobile
- ☐ Emoji Charades
- ☐ Emoji Charades 2.0 V2
- ☐ Emoji Charades 2.0
- ☑ MIB
- ☐ OMEN
- ☐ SDK Test Game

Target by Geography

Countries, Region or State

Select the countries or regions you would like this campaign to specifically be targeted in. Some prizes may be restricted based on territory and prize type. See Restrictions ⊟ United States of America  Target a specific region or state ☑ Canada  Target a specific region or province

Location Targeting

Search for a location or add a pin to target players within a radius

90045 | ⌫ | ⊙Add Pin | ▦View All
- 90045 Westchest...
- 900458 South 33...
- 90045 Island Lo...
- 90045 Sokak Sel...
- 90045 Demming ...

United States

Target by Age

- ⦿ No Age Targeting
- ○ ___ or Older
- ○ Between ___ and ___

FIG. 8C

# PROCESSING IN-CONTENT CHALLENGES FOR ONLINE GAMING SYSTEMS

CROSS-REFERENCE TO RELATED APPLICATIONS

This application claims the benefit of U.S. Provisional Application No. 62/988,291, filed on Mar. 11, 2020, which is incorporated by reference in its entirety.

TECHNICAL FIELD

This disclosure relates generally to online gaming systems and more specifically relates to processing for in-content challenges in online gaming systems.

BACKGROUND

An online game is a game played over some form of computer network, typically on the internet. Online games may range from simple text-based environments to games incorporating complex graphics and virtual worlds populated by one or many players simultaneously, which may themselves be watched by one or more spectators. A single player or multiplayer online game may be played via a game server over the internet, with other players or spectators around the world. A wide variety of online games are available for all type of game players and spectators.

Online systems such as gaming platforms support interactive media including video games, social media, streaming videos, livestreaming, reading, online shopping, online contests/raffles/lotteries, and other types of monitored media activity. Some video gamers spend tens and hundreds of hours playing through the same maps. Developers would like to modify the online gaming system to introduce dynamic content, for example, for providing messages and content items to the users during their online sessions. However, online gaming platforms represent complex interactive systems that require significant expertise for making any changes to the workflow of the interactive media. Such expertise includes coding knowledge as well as understanding of distributed systems. Furthermore, it is difficult to port user engagement from one interactive media title to another as well as engage with online gamers during an interactive media experience. Introducing dynamic content in an interactive media experience requires significant lead time, coding, and results in content that is mostly static. Conventional techniques require generation of several different type of content to provide a wider variety of content for selection at run time. This results in significant waste of manual and computational resources.

SUMMARY

A system, for example, an in-content challenge platform provides dynamically generated content to users interacting with interactive media applications, for example, participants of online games. The in-content challenge platform may receive information from several client devices of different users executing various online games and manage dynamically generated content sent to each client device based on actions performed by participants of games, for example, in-game actions. The dynamically generated content may be sent based on actions performed by participant during a particular online game, actions performed by a participant across multiple sessions of the online game, actions performed by a participant across multiple sessions of multiple games, actions performed by multiple participants, and so on.

The system receives a plurality of in-content challenges. Each in-content challenge specifies in-content challenge criteria based on actions performed by participants in online games. The in-content challenge criteria may also be referred to as a win condition that has to be met by a participant to achieve a reward. The in-content challenges may be received from content providers that want to provide dynamic content to participants of online games.

The system receives information indicating launching of an online game by a client device of a participant. Examples of information indicating launching of an online game by a client device of a participant include memory usage, CPU usage, software logs, internet transmissions, or hard drive operations. The system identifies one or more in-content challenges matching attributes of the online game and characteristics of the participant. The system initializes an action score for the participant for each matching in-content challenge.

The system repeatedly performs following steps until an in-content challenge is met by the participant. The system receives event data indicating an action performed by the participant within the online game. The system identifies an in-content challenge associated with the action. The system updates the action score for the identified in-content challenge based on a value associated with the action. Responsive to updating the action score, the system determines whether the identified in-content challenge is met by the participant. Responsive to participant meeting at least one in-content challenge, the system generates a content item for the participant and sends the generated content item to the client device of the participant. Although the embodiments are described in connection with participants of online games, the embodiments can be performed in connection with users of other interactive media applications for example, interactive media applications providing streaming content to users.

In an embodiment, the system sends information describing a measure of progress of the participant for one or more in-content challenges to the client device of the participant. The system may rank a list of in-content challenges based on an amount of progress made by the participant for each in-content challenge and send the ranked list of in-content challenges to the client device of the participant. The system may periodically update the ranked list of in-content challenges based on actions performed by the participant and send the updated ranked list of in-content challenges.

In an embodiment, an in-content challenge is met by performing actions by the participant across a plurality of sessions of the online game. The system stores action scores based on actions performed by the participant during one or more sessions and loads the action scores based on the actions performed by the participant during the one or more sessions for a subsequent session. The in-content challenge may be met by actions performed by a plurality of participants.

In an embodiment, the system dynamically generates content for providing to users of interactive media applications, for example, participants of online games. The system receives constraint symbolic expressions representing constraints on content items for presentation to participants of online games. The system receives information describing a participant of an online game. The participant is associated with one or more participant characteristics. The system generates a plurality of content symbolic expressions. Each content symbolic expression represents attributes of a potential content item. The system executes an inference engine to determine whether each of the plurality of content symbolic expression satisfies constraints specified by the constraint symbolic expressions. The system selects a subset of content symbolic expressions from the plurality of content symbolic expressions based on a result of execution of the inference engine. The selected subset comprises content symbolic expressions determined to satisfy constraints specified by the constraint symbolic expressions. The system selects a content symbolic expression from the subset of content symbolic expressions. The system generates a content item based on the selected content symbolic expression. The characteristics of the generated content item correspond to the characteristics specified by the selected content symbolic expression. The system provides the generated content item to a client device of a user.

In an embodiment, the system selects the content symbolic expression from the subset of content symbolic expressions by ranking the content symbolic expressions of the selected subset of content symbolic expressions and selecting a content symbolic expressions based on the ranking. The system may rank the content symbolic expressions by performing an unsupervised learning based clustering of the content symbolic expressions along with a set of historical content items provided to users in the past. The clustering may be performed using a feature vector representations of the content symbolic expressions and feature vector representations of historical content items. The feature vector may be generated using an encoder model, for example, a neural network based encoder configured to extract features of an input representation of a content item. In an embodiment, contents items are generated from the content symbolic expression for generating a feature vector for the content symbolic expression. The system generates a plurality of clusters of the generated content items along with historical content items using the unsupervised learning based clustering. The system may rank the generated content items based on characteristics of the cluster that is closest to each generated content item. The system may rank at least a subset of generated content items based on a measure of proximity of each of the subset of generated content items to a cluster of historical messages.

In an embodiment, the system modifies a particular content symbolic expression for a first potential content item to generate a modified content symbolic expression for a second potential content item with higher likelihood of user interaction from a participant of an online game compared to the first potential content item. The system modifies the particular content symbolic expression by repeatedly performing following steps. The system selects an attribute of the particular content symbolic expression. The system determines a perturbed value of the selected attribute of the particular content symbolic expression. The system determines whether the perturbed value of the selected attribute is likely to improve a score of the first potential content item. The system determines whether to update the selected attribute to the perturbed value based on the likelihood of improving the score.

A content symbolic expression may comprise variables representing attributes of a participant targeted with a potential content item based on the content symbolic expression. The content symbolic expression may comprise variables representing attributes of an online game played by a participant targeted with a potential content item based on the content symbolic expression. The content symbolic expression may comprise variables representing attributes of a user interface for presenting the potential content item.

BRIEF DESCRIPTION OF THE DRAWINGS

FIG. 8A is a screenshot of an example prize creation dashboard, in accordance with an embodiment.

FIG. 8B is a first example screenshot of a dashboard, in accordance with an embodiment.

FIG. 8C is a second example screenshot of a dashboard, in accordance with an embodiment.

Figure 1:
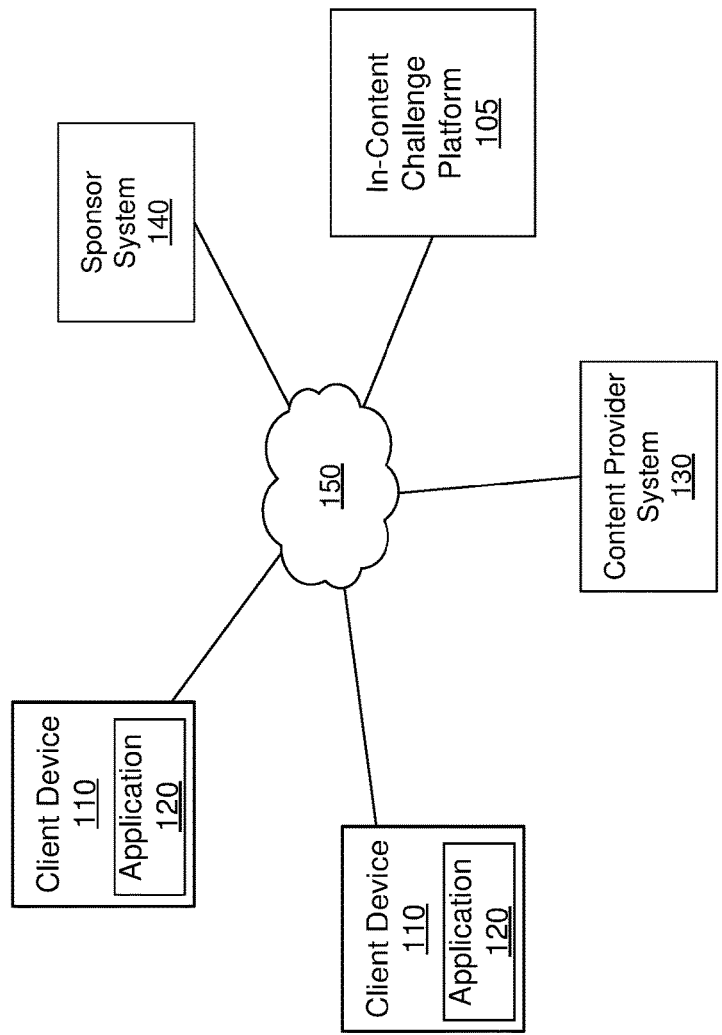
FIG. 1 is a block diagram of a system environment in which an in-content challenge platform operates, in accordance with an embodiment.

The figures depict various embodiments for purposes of illustration only. One skilled in the art will readily recognize from the following discussion that alternative embodiments of the structures and methods illustrated herein may be employed without departing from the principles described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110n" in the figures).

DETAILED DESCRIPTION

Overview

Embodiments generate dynamic content for interactive media applications, for example, online games, applications presenting streaming videos, and so on. Embodiments present dynamic content in connection with interactive media applications without requiring modifications to the instructions of the interactive media applications. Embodiments use artificial intelligence techniques for generating dynamic content for interactive media applications. These artificial intelligence techniques include symbolic artificial intelligence, unsupervised machine learning techniques, and supervised machine learning techniques.

An in-content challenge platform receives a plurality of in-content challenges. Each in-content challenge specifies an in-content challenge criterion based on actions performed by users in online games. The in-content challenge platform receives information indicating launching of an online game by a client device of a user. The in-content challenge platform identifies one or more in-content challenges matching attributes of the online game and characteristics of the user. The in-content challenge platform initializes an action score for the user for each matching in-content challenge. The in-content challenge platform repeatedly performs following steps until an in-content challenge is met by the user. The in-content challenge platform receives event data indicating an action performed by the user within the online game and identifies an in-content challenge associated with the action. The in-content challenge platform updates the action score for the identified in-content challenge based on a value associated with the action. Responsive to updating the action score, the in-content challenge platform determines whether the identified in-content challenge is met by the user. If the user meets at least one in-content challenge, a content item is identified for the user and sent to the client device of the user. In an embodiment, the content item is dynamically generated for the user.

An interactive media application may implement various aspects of video games, including pay-to-play gaming, prize-based gaming, match creation and maintenance, participant identification, and conditional prize distribution, based on participants meeting certain conditions.

Video games may be played as matches. A match is a single instance of a video game competition that, for the purposes of this disclosure, results in an operator's consideration, or prize being distributed at the resolution of the match. Matches may be of any type: single player; player vs. player; team vs. team; player vs. team; player vs. everyone, spectator-participants supporting one player vs. spectator participants supporting another player, and the like. Matches may include synchronous or asynchronous competitions where individual or multiple participants play the game and have their performances compared against one another for the purposes of ranking to aid in the distribution of prizes. For example, a player vs player match may involve two player-participants playing simultaneously in a match where the winner receives the operator consideration. A match may also be architected as a high-score-of-the-period match, which may include any number of participants competing in a contest, whether simultaneously not, that ends at a specific designated time (one day, one hour, when 100 participants have joined) at which point, all participant's scores are tallied, participants are ranked, and any number of the participants may receive some kind of operator consideration (in some embodiments, the winner may receive a greater share than other participants.) Matches may also resolve with the distribution of any prize type including real money, physical goods, downloadable content, honor, or any other.

Interactive media applications may implement an open-ended play or open-ended session but is not limited to such plays or sessions. An open-ended play or open-ended session is a type of gameplay where participants engage with a game or entertainment experience that does not necessarily lend itself to discrete match lengths or pre-established win conditions. While open-ended play may include mini-games or matches within the overall experience, the game encompasses more than the closed-ended match that resolves with the completion of a win condition. One skilled in the art may refer to such experiences as "open-world" or "sandbox" games or any games with persistent sessions. Open-ended play may exist in single player games or experiences, or it may exist in any one of a number of multiplayer environments, and massive multiplayer online games including massive multiplayer online roleplaying games. In these games, the platform may still use conditional payments and conditional prizing to award participants with prizes for their behavior, including the completion of quests, achievements, activities, or combinations thereof. Examples of games that may use the open-ended play conditional payment and conditional reward system include PC, console, mobile, ARNR, and transmedia entertainment experiences including Minecraft, Sims, Grand Theft Auto, Fallout, Elder Scrolls, The Witcher, Pokemon Go, Dungeons & Dragons, Assassins Creed, Elite, Eve, and other games and entertainment experiences. In open-ended play, participants may be awarded many times, with many different prize-types in a single session based on their play or their behavior. The accrual of participant characteristics may be compared to conditions for the purpose of prize distribution at any point during the session, at many points during the session, or consistently throughout the session.

Conventional techniques for introducing content with interactive media application require messages to be generated by an individual, group, or organization that wants to develop and deploy a content.

Within a gaming platform, prize providers must determine the parameters of the message for generation in advance of the deployment of the campaign. These include, but are not limited to attributes of items described in the content, for example: (1) Some identifier such as the SKU or UPC code for eligible items (2) An image of the item(s) (3) A variable value associated with the item, for example, a discount being offered on the item(s) (4) The duration of the campaign/an expiration date (5) The rules for message fulfillment (6) The channel where the message may be fulfilled (7) Information describing the entity associated with the item (8) The name and/or logo of the prize. An item may be a product or a service.

The systems and methods in this disclosure describe different techniques for creating and managing message campaigns in a novel and dynamic fashion with minimal inputs from the user. The systems streamline and optimize the message creation process, manage message campaigns with greater transparency and efficacy, produce greater transaction rates for each message campaign, and provide clear, actionable data about the message campaigns both during and after those campaigns. The methods in this disclosure help to solve multiple issues and limit wasted messages, improve dynamic content campaign efficacy, and improve on computational efficiency, for example, improvement in storage efficiency of messages, improvement in network bandwidth for transmitting messages, and improvement in processing efficiency of messages. The content distributor may associate a cost with each content item. The cost may be associated with manual effort as well as with use of computational resources including processing resources, storage resources, and network resources. Embodiments improve on the overall cost of generating content and distributing content for interactive media applications by improving the manual cost as well as costs associated with computational resources.

Managing a problem that is well known in the messaging sampling and rewards markets which is that the prizes must be created in advance of the competition. This system decreases waste and improves efficiency and is superior to prior systems even infinite humans with infinite time not just because it is faster and more precise because it deals with a fixed problem that is the problem of which messages to create in advance by creating the message's dynamic play in a way that humans cannot and would not.

Embodiments use propositional logic, Boolean logic, or symbolic artificial intelligence (AI) and expert system to create a table to allow various aspects of a message to be in flux. The only elements of a message that would be necessary in the system is the name of an item for which messages are being generated, for example, the name of a product that has been discounted. All other aspects of the message could be in flux even during the process of campaign deployment. The player viewer or user of the message would have an opportunity to impact the ultimate layout of the message given their choices.

In one embodiment, the only input the system needs is the name of the product. The system created messages dynamically. This results in less waste compare to, for example, physical implementations of processes that require a full set of physical messages to be created for each use case. Accordingly, the system creates an offer that, once chosen, creates a message with a potential batch size of one. A limited campaign puts a cap on messages that can be created. Accordingly, the embodiments provide improvement in development effort as well as storage requirements compared to conventional techniques that require each content items to be created and stored.

Rather than manage the creation of the message, a campaign is created and the messages in that campaign can be distinct and dynamic, governed by this system and method, coupled with the actions of the player/viewer/participant.

Conventional solutions require 1 on 1 promotion contracts with game developers and use of significant development time/effort to add messages/$3^{rd}$ party content to games. In contrast, embodiments provide automatic introduction of messages or third-party content in interactive media applications.

Conventional techniques have static, repetitive, billboard-like promotions placed in interactive media applications. In contrast, embodiments dynamically generate content that is customized to specific situation (geography, specific user (target audience), specific game situation).

Embodiments automate message creation process, manage campaigns with greater transparency and efficacy, produce greater transaction rates for each campaign, and provide prize providers with clear, actionable data about their campaigns both during and after those campaigns.

Embodiments present dynamic content in connection with interactive media without requiring modifications to the instructions of the interactive media. The system interfaces with interactive media applications without requiring source code modifications to the interactive media applications. Conventional techniques that require source code modifications to the interactive media applications for introducing content in the interactive media applications require significant development efforts as well as use computing resources in development, testing and deployment of the interactive media applications. Furthermore, source code modifications may introduce defects in the source code resulting in higher likelihood of failure of the interactive media applications at execution time. Embodiments decouple the instructions for generation of dynamic content from the interactive media application, thereby making decreasing the likelihood of failures in the interactive media applications as a result of instructions for introducing dynamic content.

Furthermore, conventional techniques that require source code modifications to the interactive media applications for introducing content in the interactive media applications result in displaying content that is mostly static since most of the parameters of the content cannot be changed after the source code of the interactive media application is finalized and deployed. In contrast, embodiments allow significant changes to the various parameters of the dynamic content displayed in connection with the interactive media content. As a result, the embodiments provide higher degree of dynamic behavior of the content displayed with the interactive media applications.

Furthermore, separation of the instructions for introducing content in the interactive media applications from the interactive media applications allows the in-content challenge platform to be run independent of the interactive media applications, for example, as an independent online system that interacts with the interactive media application via network. This provides security against malicious users that may try to obtain rewards by modifying the instructions or parameters of the system managing dynamic content to obtain rewards without meeting the in-content challenges. The instructions for managing the dynamic content may include instructions for providing rewards to uses that meet the in-content challenges. In systems where the instructions for managing the dynamic content are on the same machine as the interactive media application, for example, on the client device running the interactive media application, the user has access to the instructions for managing the dynamic content, thereby making it simpler for a malicious user to manipulate the system. In contrast, separation of the in-content challenge platform from the interactive media application and execution on an independent online system makes it harder for malicious users to manipulate the instructions for managing dynamic content.

Systems describing tournaments for video games and interactive media experiences are described in U.S. Pat. No. 10,242,538, issued on Mar. 26, 2019, U.S. Pat. No. 10,888,789, issued on Jan. 12, 2021, U.S. Pat. No. 10,789,816 issued on September 2020, and U.S. patent application Ser. No. 16/687,585, filed on Nov. 19, 2019, each of which is incorporated by reference herein.

System Architecture

Figure (FIG. 1 is a block diagram of a system environment 100 for an in-content challenge platform 105. The system environment 100 shown by FIG. 1 comprises in-content challenge platform 105, one or more client devices 110, one or more third-party systems 130, one or more sponsor systems 140, and a network 150. In alternative configurations, different and/or additional components may be included in the system environment 100.

The client devices 110 are one or more client computing devices capable of receiving user input as well as transmitting and/or receiving data via the network 150. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 150. In one embodiment, a client device 110 executes an application allowing a user of the client device 110 to interact with the in-content challenge platform 105. For example, a client device 110 executes a browser application to enable interaction between the client device 110 and the in-content challenge platform 105 via the network 150. In another embodiment, a client device 110 interacts with the in-content challenge platform 105 through an application programming interface (API) running on a native operating system of the client device 110, such as IOS® or ANDROID™. In another embodiment, a client device 110 interacts with the in-content challenge platform 105 through a client application 120 provided by the in-content challenge platform 105.

The client devices 110 are configured to communicate via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

One or more third-party content provider computing system 130 (e.g., a game developer, a media service provider, an application developer, video production company, an individual user content provider, etc.) may be coupled to the network 150 for communicating with the in-content challenge platform 105. In one embodiment, a third-party content provider computing system 130 is a content provider communicating content for consumption on a client device 110 or communicating data to client devices 110 or the in-content challenge platform 105 for use by an application executing on the client device 110. In other embodiments, third-party content provider computing system 130 provides content or other information for presentation via a client device 110. A third-party content provider computing system 130 may also communicate information to the in-content challenge platform 105, such as advertisements, content, or information about an application provided by the third-party content provider computing system 130.

One or more sponsor systems 140 may be coupled to the network 150 for communicating with the in-content challenge platform 105. The sponsor systems 140 communicate in-content challenge criteria to the in-content challenge platform 105 to generate in-content challenges within the in-content challenge platform 105, which is further described below in conjunction with FIG. 2.

The dynamic content may be sponsored content that is part of a "campaign" to bring attention to a new product, event, or organization. A message may associate with, for example, an offer, or a sample.

A participant or participants are any person(s) who are playing in, broadcasting, or spectating, or watching a game, match, or tournament. Participants may include any persons who are engaging in or with a match or game, including those who have paid a participant consideration, as well as those who have joined a sponsored match, or those who are playing or spectating for honor without having paid a participant consideration. A participant may include those who have an intention or goal of winning some type of prize, payout, or consideration, including participation awards. In particular example embodiments, participant may also refer those who are engaging with an entertainment experience who may be eligible for surprise-and-delight prizing without having made a specific election to join a particular match.

Player-participants are those individuals playing in the game while spectator-participants may, in some embodiments, be watching and wagering on the outcome while not playing in the match itself. For the purposes of this disclosure, both spectators and players may be considered participants. There may also be additional participant types (broadcaster-participants, for example) who may also be considered to be participants who may, in certain circumstances, be required to meet certain requirements in order to interact with the system.

Participant consideration is the money, virtual currency, virtual good, or code that is paid by a participant, player, spectator, team, or sponsor as a condition of entering a session, match, or tournament. The participant consideration may be referred to as an entrance fee or buy-in. This consideration may be paid, provided, or exchanged by a participant through any means including virtual currency, real money, or through a code, coupon, or item that grants the participant entrance to play or wager on a match or tournament.

In some embodiments of the system, a sponsor may pay the participant consideration on behalf of participants. Payout is the process of awarding the operator consideration to the one or more participants who are deemed by the operator to have fulfilled the win condition. This disclosure deals in large part with the mechanics of the payout process.

Physical goods are a potential operator consideration type that may be offered by the operator as a prize for fulfilling the win condition. They are not a currency, and may not include real money or its equivalents, but may include such things as t-shirts, games, hats, physical games, tickets to events and other physical goods. Physical goods may also be referred to as Consumer Packaged Goods ("CPG").

Regional restrictions are participant and prize eligibility restrictions established by an operator or system administrator. In some cases, regional restrictions can be concatenates or combinations of participant and or game characteristics that determine the basis for whether participants may participate in certain matches, or whether participants are eligible for certain prizes. For example, a region (Region X) might be restricted such that no participants of any type below 18 years of age may play for real money, but player-participants (and not spectator participants) as young as 13 years of age may be eligible for downloadable content as a prize type. In this case Region X could be said to have regional restrictions on age, participant type, and prize type. Regional restrictions may appear in some versions of the platform as a list of thresholds or a simple concatenate of terms that represent minimum eligibility requirements for participation in matches or minimum thresholds for the receipt of certain prizes. Regional restrictions may be a large part of the calculus for how the system determines whether a region is restricted or available.

Restricted regions are all of those geographical regions where participants currently in those regions may not participate in a match or tournament. Not available regions are defined by the System Administrator and cannot be changed by an operator. System administrators may use federal, state, or local laws as part of their calculus for determining a restricted region. In particular example embodiments, an operator may determine that the state of Tennessee should be considered a restricted region for any participant type, match type, prize type, or for any age of participant. In this example, no participant, once it is determined that they are currently located in Tennessee, may participate in any match. Participants may be notified of the region's status, but that notification may then not allow them to participate. In the event that the system administrator has determined a region to be restricted, the operator will not have the ability to make the region available.

Session is a length of time during which a player or other participant is determined by an operator to be engaged in participating in a game. In some embodiments, it may be that a session is determined by the operator to be the period of time where a participant is logged into, and actively engaging with the platform. In particular embodiments, an operator may determine that a session may extend across a single match, across multiple consecutive matches, or across several separate matches, which may comprise a laddered tournament. It may also be that, in some open-play or open session environments that a session is defined as the period of time that the participant is logged in to, and playing on, or engaging with, the platform. In one embodiment of the system, a session is the period of time between when a participant logs into and logs out of their PC, console (playstation, xbox or similar), or mobile device (iphone, android phone, smartphone, tablet, wearable device, and the like).

A session length may consist of several matches over the course of two to three hours, for example. At the operator's discretion, there may be artificial "check-in" prompts periodically to prove that a participant is actively engaging with the platform, or an operator may put a cap on session length (sessions may not last for more than 8 hours, for example, or a prompt may appear every two hours, or two days, to encourage participants to re-submit certain location or other data to confirm active engagement). In particular embodiments, over the course of a session, a participant's participation type (changing from player to spectator, for example) may prompt the system to ask the participant to enter new characteristics or for the system determine additional characteristics that would help the system to determine participant eligibility status for the remainder of the session.

In one embodiment of the system, a participant's location may be verified by the system at the beginning of their session and any prize types that said participant may be eligible for based on their location, age, and participant identity characteristics, may be determined for that active session at that time. In some embodiments, a participant may not materially change locations (such as from one state to another) during their session or they may risk breaching their terms of service. Additional in-session location checks may be performed during a session to ensure compliance. Any participant whose location is deemed undetermined by the system may be ruled ineligible for certain matches and prizes for the duration of the session, or until their position-location can be determined.

Sponsor is a party that is not the participant who promotes a session, a portion of a session, a match, or a tournament. For example, in one embodiment of the system, a sponsor may pay the participant consideration for a match or a set of matches for a certain number of participants. In another embodiment, sponsors may provide the prize for the match. In another embodiment, the sponsor may provide advertising to promote a match. Sponsors may be individuals or companies. Sponsors may provide prizing for a given match or set of matches. For example, a sponsor may work with an operator to create a promotion where the top score of the day wins tickets to an event, brought to you, for example, by sponsor Live Nation, or the winner of a given match or tournament wins a Tesla Model S car, brought to you by sponsor Tesla. Sponsors may enter into agreements with operators such that certain matches have no participant consideration-instead, that consideration may be said to have been paid by the sponsor and in such an example, the entry into that match may be free for participants to enter. Sponsors may also advertise the platform, the system, or a given match online or through any type of media to promote the matches and bring awareness of their goods or services to the participants in those matches.

A team is any group of participants who make an election to a match together or any group of participants who the system has determined must work together to achieve a common win condition. In particular embodiments, teams will work together in-game in an effort to win prizes in a given match. In some embodiments of the system a team is defined by the operator prior to entering a match. A team may comprise one or more participants. For example, in one embodiment of the system a single participant joining a match may be considered an individual team with the participant as the sole member of a team of one. In particular embodiments, the participant may also act as the captain for the team making certain elections on behalf of the team, just as in some embodiments, the system may designate, or participants may choose, a team captain who is responsible for certain activities, including in some embodiments, providing the participant consideration, choosing the match, the map, the team colors, and the like.

Virtual players or virtual participants may include bots or non-human software programs that may be designed to mimic the actions of a player or other participant in a given game. In one embodiment of the system, virtual players may be used to assess a participant's skill level so that they may be matched with other real participants of similar skill. In another embodiment of the system, participants may play against any number of virtual players in a given match or tournament. In another embodiment of the system, all of the player-participants in a given match or tournament may be virtual players, for example, in a contest of who can write the best bots for a given game. A match made up of all virtual players may also help to determine the outcome for some types of games where the participants manage virtual players or groups of virtual players rather than compete directly with another live participant. Virtual players may also be used by an operator as a part of a quality control or fraud-detection system.

Win condition is a condition or set of conditions that, having been met, trigger a prize distribution by the system. A win condition may also describe a game state that must be reached to establish the order of finish in a particular match or tournament such that prizes may be distributed. In particular embodiments, a win condition may be reached by multiple participants that may then be sorted by the system or by the operator into ranks. For example, a first, second, third, fourth place finisher through to X place may achieve the win condition and each participant may be awarded a prize consistent with their rank. In particular embodiments, there may be a winning participant or team and a losing participant or team. In particular embodiments, the winning participant or team of participants may be the only participants that the system determines to have met the win condition. In particular embodiments, the win condition may be established by the operator and is known to all participants prior to acceptance of their consideration for entry into the match or tournament. In other embodiments, the win condition may be met by a single participant, playing alone and achieving certain achievements. In other embodiments, especially those that have surprise and delight prizing, the participant may not be aware that they are participating with a prize as the goal. In this case, it may still be possible for such a participant to be determined by the system to have achieved the win condition. Regardless, the achievement of the win condition by a participant or multiple participants may be seen as the catalyst for prize distribution and fulfilment.

Operators, and in particular embodiments, participants, players, or teams, may establish and agree, in advance of the game, the win condition that will be used to determine whether an reward/offer is presented to the participant. This win condition may be an in-game goal, such as most points, most kills, checkmate, capturing a flag, controlling an area, scoring a certain number of points, collecting victory points, or completing a mission. The win condition may also be a loss avoidance or piece elimination condition, such as being checkmated, running out of cards, running out of hitpoints, being tagged, or it may be a puzzle-guessing condition, such as successfully solving a puzzle or a riddle, or it may be a race to advance beyond a certain position, or amount of points, or it may be a condition that requires participants or players to acquire or assemble a set of resources into a defined winning structure or into a structure that is determined to be better than the structures of other participants. A win condition may be the completion of certain achievements or sets of achievements while in-game. For spectator-participants, their win condition may be that the team or player that they support or wager on has achieved their own win condition. The win condition may also be any combination of achievements or loss-avoidance that has been established by an operator. In particular embodiments, the win condition may be such that multiple participants may achieve the state, or it may be that in some matches that only one participant may achieve the state. In particular embodiments, achievement of the win condition may confer the operator's consideration on the winner(s) according to the conditions of the session, match, or tournament.

In-Content Challenge Platform

Figure 2:
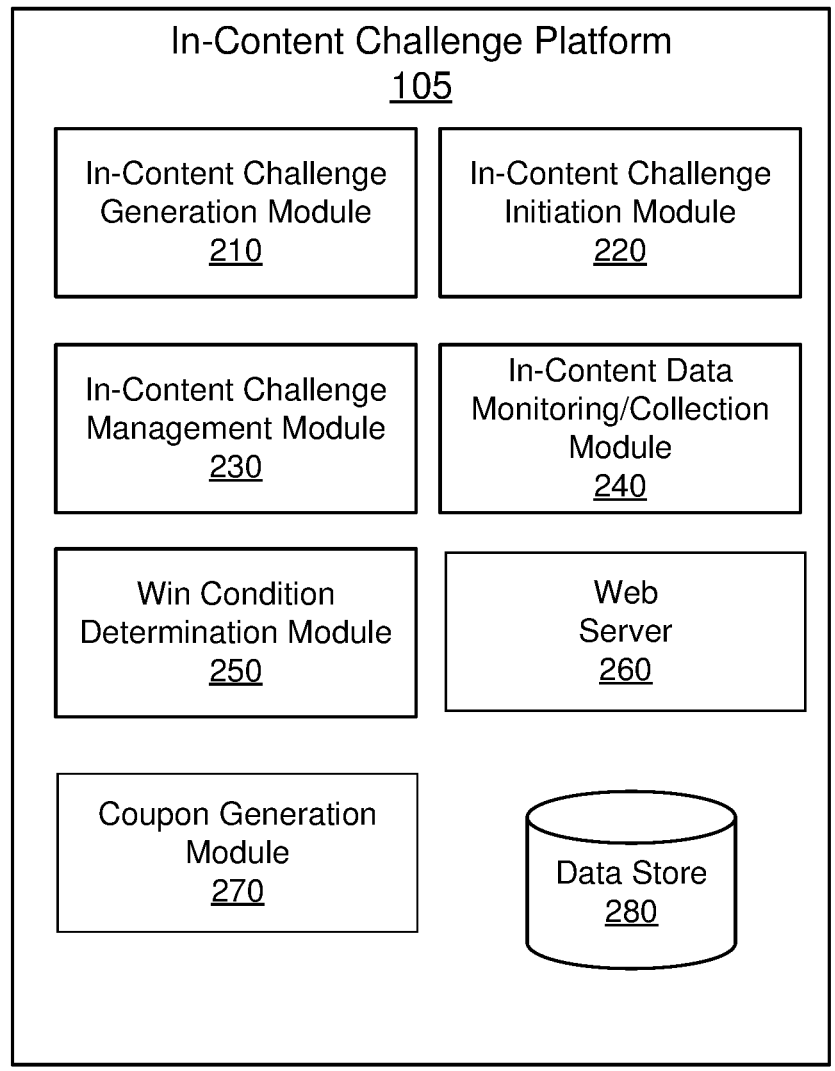
FIG. 2 is a block diagram of an in-content challenge platform, in accordance with an embodiment.

FIG. 2 is a block diagram of an architecture of an in-content challenge platform 105. The in-content challenge platform 105 shown in FIG. 2 includes an in-content challenge generation module 210, an in-content challenge initiation module 220, an in-content challenge management module 230, an in-content challenge data monitoring/collection module 240, a win condition determination module 250, a web server 260, a message generation module 270, and a data store 280. In other embodiments, the in-content challenge platform 105 may include additional, fewer, or different components for various applications. Conventional components such as network interfaces, security functions, load balancers, failover servers, management and network operations consoles, and the like are not shown so as to not obscure the details of the system architecture.

Figure 3:
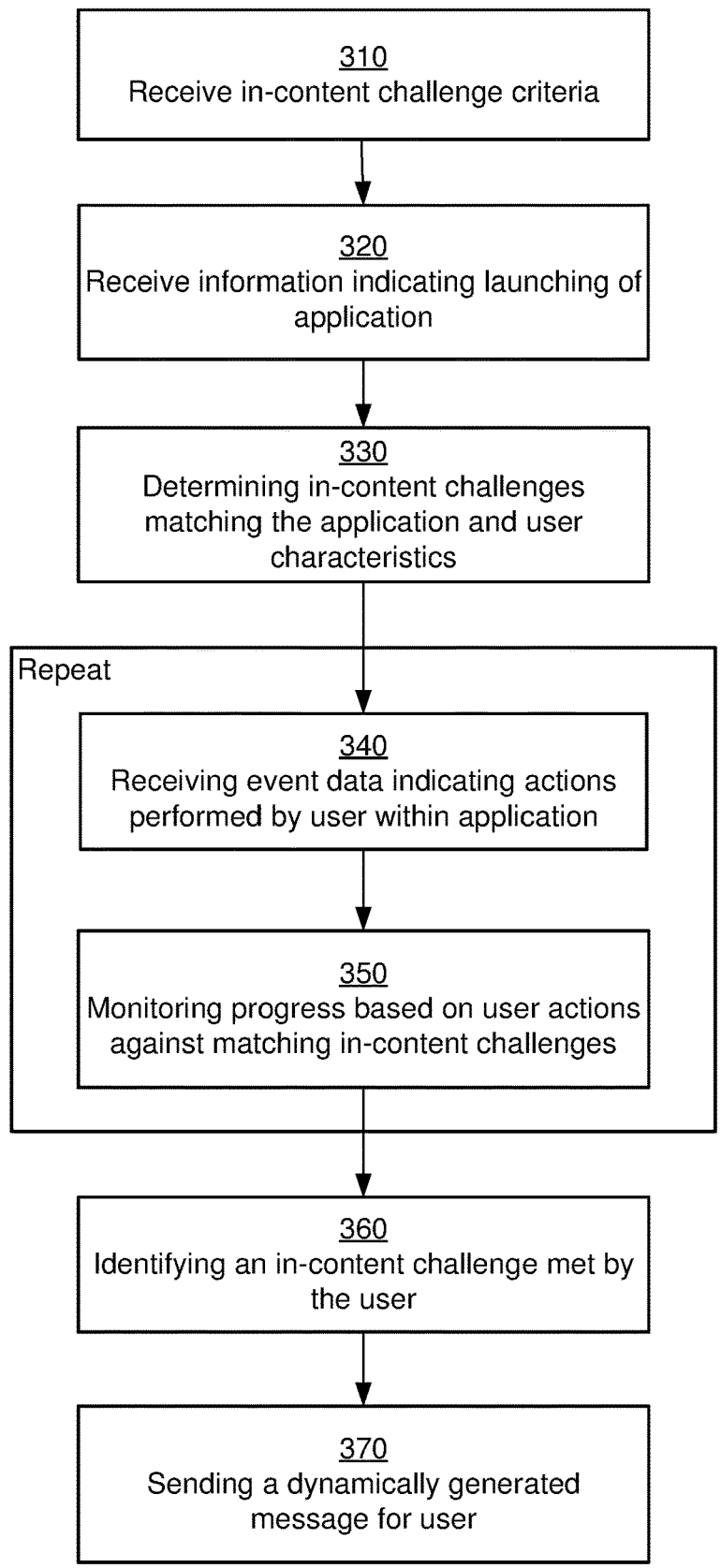
FIG. 3 is a flowchart of a process executed by the in-content challenge platform according to an embodiment.
Figure 4:
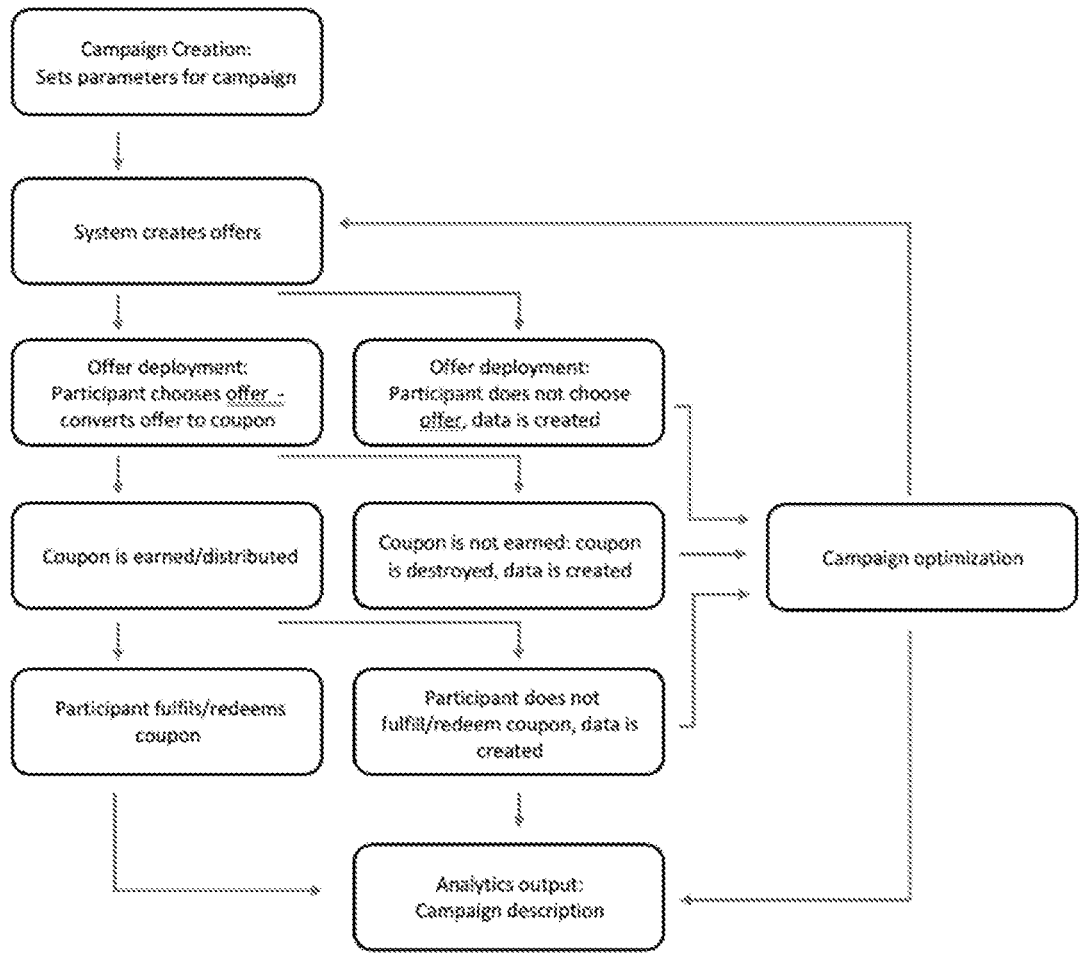
FIG. 4 shows a message creation workflow for a gaming platform, in accordance with an embodiment.

FIG. 3 is a flowchart of a process executed by the in-content challenge platform according to an embodiment. The steps of the process may be executed in an order different from that indicated in FIG. 3. Furthermore, the steps may be performed by modules different from those indicated herein.

The in-content challenge generation module 210 receives 310 in-content challenge criteria from sponsor systems 140 and/or other content creator systems to generate the in-content challenges within the in-content challenge platform 105. In one embodiment, the in-content challenges are sponsored content items, for example, content item representing a brand promotion provided to users for the completion of a specific task within an instance of content. In an embodiment, a challenge criteria is represented as an expression based on action performed by one or more users during one or more sessions of one or more online games. The challenge criteria may also be referred to as win condition. The expression may be based on various variables that represent game characteristics, attributes of actions performed by the user within the game, and user characteristics. Although the embodiments are described in connection with online games, the techniques described can be applied in the context of other media based applications, for actions performed by users in an application that streams videos to the user, or an application that presents images or messages to the user, application that allows users to perform social interactions with other users. An in-content challenge may also be referred to herein as a challenge.

As an example, a restaurant may establish an in-game challenge for a football video game (e.g., x number of touchdowns, etc.) to generate a message corresponding to win a reward for 50% off their meal during Monday Night Football. Thus, the challenge criteria may include a content type (e.g., video game, movie, show, fitness application, etc.) a content title (e.g., video game or movie title), a prize, a win condition for winning the prize, user targeting characteristics (e.g., age, location, interests, etc.) and other relevant or more specific information depending on the scope of the challenge being defined by the sponsor. In the football game example, the content type is a video game, the title might be Madden 29, the prize is a 50% off discount at the restaurant during Monday Night Football, the win condition is x number of touchdowns during the game, and the sponsor may additionally define user targeting characteristics that the user be over 21 years of age, live within a set of zip codes (e.g., that are close to the restaurant) while using a particular gaming system (e.g., only Xbox One and PlayStation). Accordingly, with the challenge criteria, the in-content challenge generation module 210 generates the in-content challenges. This allows representatives of sponsor systems 140 to easily generate promotions offering a specific prize to targeted participants for completion of the specific criteria within the interactive media.

The in-content challenge initiation module 220 receives 320 information indicating that a user initiated a session to consume an instance of content, for example, the user started playing an online game. In an embodiment, the information describing user actions on the client device are provided to the in-content challenge platform by an application, a process, or a library executing on the client device of the user that is configured to collect information from the client device and provide to the in-content challenge platform in a secure manner. The user may be requested for permission to allow his information to be provided to the in-content challenge platform to allow the in-content challenge platform to provide various features to the user.

In one embodiment, the in-content challenge initiation module 220, via client application 120, tracks and analyzes local client device 110 operations to determine video game or other content operations. For example, the in-content challenge initiation module 220 may analyze memory usage, CPU usage, content "launcher" usage, software initiation logs or other comparable logs in the Operating System, internet transmissions, hard drive operations, or any other system metrics for recognized evidence that a certain game or other piece of software is being played/viewed/used. Tracking such processes allows in-content challenge initiation module 220 to recognize specific software or system events that indicate that a user is about to play a game on their game console or has launched a video streaming service application on their television or tablet computer. In one embodiment, in-content challenge initiation module 220 recognizes and identifies transmissions to specific IP addresses, servers, or other remote access methods as relating to specific entities. Accordingly, in response to receiving such an indication, in-content challenge initiation module 220 launches the in-content challenge platform 105 on behalf of the user.

The in-content challenge management module 230 determines 330 one or more available in-content challenges in response to receiving the indication that the user initiated a session to consume an instance of content. The in-content challenge management module 230 determines the available in-content challenges based on (1) the content type of the instance of content, for example, the type of online game that the user is playing and (2) characteristics of the user matching in-content challenge criteria associated with each in-content challenge. The in-content challenge management module 230 provides the available in-content challenges for display to the user on the user's client device and awaits a selection. In an embodiment, an in-content challenge may require multiple sessions of the same online game by a user or sessions of different games. Accordingly, the user may be partially meeting the in-content challenge when the user starts the current session.

In an embodiment, the in-content challenge management module 230 initializes an action score for the participant for each matching in-content challenge, for example, to value zero. The in-content challenge management module 230 repeatedly performs the following steps. The in-content challenge management module 230 event data indicating an action performed by the participant within the online game. Each action is associated with a value. The in-content challenge management module 230 identifies an in-content challenge associated with the action and updates the action score for the identified in-content challenge based on a value associated with the action. Responsive to updating the action score, the in-content challenge management module 230 determines whether the identified in-content challenge is met by the participant. If the identified in-content challenge is met by the participant the in-content challenge management module 230 proceeds to send a content item such as a message describing a reward, for example, an offer or a coupon to the client device of the user. In an embodiment, the in-content challenge management module 230 stores action scores based on actions performed by the participant during one or more sessions and loads the action scores determined based on the actions performed by the participant during a subsequent session. The subsequent session may be of the same online game or another online game, depending on whether the in-content challenge is based on the same online game or multiple online games. In an embodiment, the in-content challenge management module 230 maintains an in-content challenge based on actions performed by multiple participants. Accordingly, the in-content challenge management module 230 tracks the set of participants and monitors event data for each participant from the set. The in-content challenge management module 230 determines action scores for event data received from each participant and updates the aggregate action score for the in-content challenge until the challenge criteria is met.

The in-content challenge management module 230 presents the in-content challenges that the user is partially satisfying along with an indication of the amount of progress that the user has met towards meeting the in-content challenge or the amount of effort remaining to meet the in-content challenge. For example, the in-content challenge management module 230 may present via a user interface a message indicating that the user has partially satisfied a particular in-content challenge and provide a percentage value indicating the amount of progress, such as 80% in-content challenge has been met. In an embodiment, the in-content challenge management module 230 ranks the matching in-content challenges based on the amount of progress made by the user, thereby presenting challenges that are closer to being completed higher than challenges that need significantly more effort toward completion. In an embodiment, the in-content challenge management module 230 periodically presents an updated list of in-content challenges to the user with an updated indication of the amount of progress made for each in-content challenge. For example, the in-content challenge management module 230 recomputes the progress made by the user periodically, re-ranks the in-content challenges based on the amount of progress made by the user for each in-content challenge and sends the ranked list to the client device of the user for displaying via the display of the client device.

In an embodiment, the in-content challenge management module 230 uses supervised learning based machine learning models for identifying challenges for a participant of a game. The in-content challenge platform receives information describing user actions. The in-content challenge management module 230 trains a machine learning based model to receive as input, a sequence of user actions performed in an online game, for example, information extracted from event data collected from the client device describing actions performed by the user in an online game. The training data for training the machine learning based model may be generated manually by experts. The training data for training the machine learning based model may be obtained by mining historical data based on what challenges were accepted by participants of online games in the past after performing various sequences of actions. The machine learning based model is trained to predict a score indicating a likelihood of the user meeting an in-content challenge at the current stage of the online game. The in-content challenge management module 230 executes the machine learning based models to determine scores for each of a plurality of in-content challenges stored in the in-content challenge platform. The in-content challenge management module 230 ranks the various in-content challenges based on the scores. The in-content challenge management module 230 selects one or more in-content challenges based on the ranking, for example, the top few in-content challenges that the user is likely to meet in the near future based on the current sequence of actions performed by the user in the online game. In an embodiment, the in-content challenge management module 230 selects one or more in-content challenges that are within a range of scores that has a minimum score and a maximum score, thereby ensuring that the in-content challenges are not too easy for the user (i.e., having scores above the maximum score limit) and the in-content challenges are not too difficult for the user (having scores below the minimum limit). The in-content challenge management module 230 send information describing the selected in-content challenges to the client device of the user, requesting the user to accept one or more challenges. The use of the supervised learning based machine learning model ensures that the user is presented with in-content challenges that the user is highly likely to meet in the near future. If the user is presented with challenges that are too easy or too difficult, the user is less likely to be interested in meeting the challenges. In an embodiment, the range of scores is adjusted based on user feedback based on historical data to identify a range where user have maximum engagement.

The machine learning based model maybe a neural network. In an embodiment, the machine learning based model is a recurrent neural network that takes as input a sequence of user actions. Each user action is encoded, for example, based on a numeric value representing a type of action performed by the user and one or more attributes of the user action, for example, attributes indicating a score value attained by the user as a result of the action. In another embodiment, the machine learning based model is a multi-layer perceptron that receives a fixed size encoding based on the sequence of user actions. For example, the input may be configured to receive as input the past N (e.g., N=10) actions performed by the user. The past 10 actions are selected as a moving window that is constantly adjusted.

In one embodiment, the in-content challenge management module 230 also determines what prizes are available for each in-content challenge based on matching of attributes such as user characteristics against attributes of the in-content challenge. For example, two users playing the same in-content challenge, but located in different states or countries, may not be able to qualify for the same prizes because of local availability. Moreover, two different users may play the same in-content challenge, but qualify for different prizes based on their age or other user characteristics. Responsive to receiving a selection from the user to an available in-contest challenge, the in-content challenge management module 230 initiates the in-content challenge to allow the user to consume the instance of content while also attempting to win the prize associated with the in-content challenge.

In one embodiment, the in-content challenge management module 230 also provides the user with a client application of the in-content challenge platform 105 for installation on the client device of the user that facilitates communication and challenge services to the user. Thus, the client application allows the user to access the in-content challenges.

The in-content challenge data monitoring/collection module 240 receives in-content engagement statistics from the third-party content provider computing system 130 that provides the instance of content via an application programming interface (API) provided by the third-party system. However, in-content challenge data monitoring/collection module 240 can be configured to consolidate results and performance from the third-party content provider computing system 130 in a number of ways: 1) incorporate platform data sharing directly into the content, 2) code the platform to analyze and draw game/content statistics directly through a network based API provided by the third-party content provider computing system 130 (e.g., video game developer, content creator, etc.) for community game interaction and customization, and 3) analyze client device 100 operations to determine video game operation. In some embodiments, in-content challenge data monitoring/collection module 240 retrieves in-content statistics locally stored on a user's client device. Accordingly, in-content challenge data monitoring/collection module 240 may directly retrieve game statistics from locally stored game data and transmit that information to the platform 200 servers for incorporation, verification, prize qualification, or analysis.

The in-content challenge platform repeats the steps 340 and 350, for example, until one or more challenges are met or until a time limits is exceeded. Accordingly, the in-content challenge platform receives 340 events data indicating actions performed by user or users within the application, for example, within the online game and monitors 350 progress of the user based on user actions relevant to matching in-content challenges.

In one embodiment, the in-content challenge data monitoring/collection module 240 receives 340 event data from the third-party content provider computing system 130 when relevant, flagged, or predetermined actions are performed by the user within the game or other content provided by the third-party content provider computing system 130. The in-content challenge platform 105 uses the event data to apply progress against active challenges with win conditions based on the events matched on event name. In one embodiment, the event data is structured in the JavaScript Object Notation (JSON) format. The event data contains a name for the event can match the name of a win condition rule, at least one timestamp indicating at least the start and additionally maybe the finish of the event, the delta between the timestamps is the duration of the event (which may be zero for instant type events, such as enemy kills), the event durations from events of the same name may be combined to reach totals required by win condition rules of a matching name, and a value for the event. The event data contains an integer value. Values from events of the same name may be combined to reach totals required by win condition rules of a matching name. Events performed by the user within the third-party content provider computing system 130 may generate more than one event. In one embodiment, multiple events with names of varying levels of granularity may be triggered. For example, if the user was to kill a boss tier enemy named "Gurgan the Demon Prince" in a game, the third-party content provider computing system 130 might trigger the following events: (1) Name: 'KILL_ENEMY', Value: 1 (2) Name: 'KILL_BOSS', Value: 1 (3) Name: 'KILL_DEMON', Value: 1 (4) Name: 'KILL_GURGAN', Value: 1 (5) Name: 'INFLICT_DAMAGE', Value: 25,000.

In another example, if the user wants to watch an episode of the comedy "The Office" on a video streaming service, the third-party content provider computing system 130 might trigger the events: (1) Name: 'WATCH_SHOW', Value: 1 (2) Name: 'WATCH_COMEDY', Value: 1 (3) Name: 'WATCH_THE_OFFICE', Value: 1 (4) Name: 'WATCH_THE_OFFICE_SEASON_1_EPISODE_5', Value: 1.

In an embodiment, challenges are specified using expressions. For example, user actions are associated with values and the challenge requires user to exceed an aggregate value based on a set of actions performed within a time interval. The expression may specify more than a threshold number of actions of a particular type to be performed to meet the challenge. The expression may specify thresholds for each of a plurality of action types. Accordingly, the user is required to exceed the corresponding threshold of each of the action types, for example, the user may be required to perform n1 actions of action type A1, n2 actions of action type A2, n3 actions of action type A3, and so on. The expression may specify a time limit within which the challenge has to be met. The system tracks actions of various types using counters for each action type. The counters are reset if the user exceeds the time limit. In an embodiment, the expression specifies an order between actions of different type, for example, the challenge requires user to perform an action of type A1 before performing an action of type A2.

In an embodiment, the challenge may be met by performing actions across a plurality of sessions. The system tracks actions of the user performed across sessions. Accordingly, when the user closes a session of online game, the system stores the status of various challenges for the user. When the user starts a second session, the system loads the status of each challenge applicable to the user and continues tracking the progress by the user.

In an embodiment, the challenge may be met by performing actions across a plurality of different online games. Accordingly, the expression describing the challenge qualifies the actions of different action types with the online games in which the action is performed. A user may close a session of one game and create a new session of a different game. The system tracks the progress of the user across games and determines whether the challenges are met by the user based on an aggregate value based on actions performed across a plurality of games as specified by the expressions of the corresponding challenges.

In an embodiment, a challenge may be met based on actions performed by a plurality of users, for example, if a game involves teams of users. The system may require the users to register for a challenge or challenges. The system tracks actions performed by the plurality of users as an aggregate. Accordingly, the system receives information describing actions performed by a set of users and maintains aggregate values based on actions performed by the plurality users. If the aggregate values meet thresholds specified by the challenge, the plurality of users meet the challenge. Each of the users from the plurality of users may be presented with a reward. Alternately the reward may be provided to a representative from the plurality of users.

Thus, in one embodiment, the third-party content provider computing system 130 generates custom events for the in-content challenge platform 105. The third-party content provider computing system 130 may remain agnostic to specific challenges provided by the in-content challenge platform 105 during an integration process where the events and in-content challenges between the in-content challenge platform 105 and the third-party content provider computing system 130 are established. Thus, win conditions may be defined using any of the possible event names the third-party content provider computing system 130 is capable of generating at a later time. In this way, challenges of varying difficulty can be created by adjusting the target values, target durations, and specificity of the events. For example, a low difficulty challenge could be created based on the event "KILL_ENEMY" with a target value of 5. Any combination of "KILL_ENEMY" events with values summing to 5 or more would satisfy this win condition. For example a high difficult challenge could be created based on the event "KILL_GURGAN" with a target value of 1. Only an event indicating the user had killed the specific boss (e.g., a Gurgan) would generate a win for this challenge.

Multiple challenges can concurrently be active for a user. Events received by the in-content challenge data monitoring/collection module 240 are applied to any and all active challenges where the win condition rules match the names on the received events. The progress is updated on each challenge based on the win condition rule targets and the accumulated values and durations from the relevant events.

In other embodiments, the third-party content provider computing system 130 remotely stores in-content statistics relevant to potential challenge win conditions on publicly accessible servers. This allows the in-content challenge data monitoring/collection module 240 to directly retrieve remotely stored in-content statistics from remote application programming interface (API) servers, and incorporate, verify, prize qualify, or analyze the information before, after, or at the same time as transmitting this information to the user's local platform 200 dashboard. Similar to direct game integration via an API, remotely stored in-content data retrieval by the platform 200 minimizes the risk of local manipulation of the in-content challenge results (e.g., users falsifying their in-content statistics to fraudulently win prizes). This additional layer of reliability may be important or even necessary to verify results for challenges including some high-value or high-prestige challenges that may require a participant to complete difficult, or time-consuming win conditions.

In another embodiment, the in-content challenge data monitoring/collection module 240 receives data via one or more APIs of the third-party content provider computing system 130 to generate events based on user actions within the content. For example, using an API of the third-party content provider computing system 130, game matches that a user has played can be determined. Then, with the game match data, specific event data around what happened in each match that fits a time window for one or more challenges created by the in-content challenge platform 105 can be determined. For example, if the in-content challenge platform 105 determines that in a match the user's team won the match, the system generates a "MATCH_WON" event. If the in-content challenge platform 105 determines that the user made 3 champion kills, the in-content challenge platform 105 generates an event "CHAMPION_KILL", with a value of 3. All of this is based on the results of the match provided by the API.

The in-content challenge data monitoring/collection module 240 may also analyze local client device operations to determine video game or other content operation. The in-content challenge data monitoring/collection module 240 may analyze memory usage, CPU usage, content "launcher" usage, software initiation logs or other comparable logs in the Operating System, internet transmissions, hard drive operations, or any other system metrics for recognized evidence that a certain game or other piece of software is being played/viewed/used. In some cases, such processes would allow the in-content challenge data monitoring/collection module 240 to recognize specific in-game data or in-software events. In one embodiment, the in-content challenge data monitoring/collection module 240 is programmed to recognize and identify transmissions to specific IP addresses, servers, or other remote access methods as relating to specific gameplay (e.g., multiplayer match-making). In another embodiment, the in-content challenge data monitoring/collection module 240 is be programmed to recognize that a user has entered a specific level when the video game accesses or updates a locally stored file containing level-specific game resources. Further, the platform 200 will take steps to secure, anonymize, or pseudonymize individual user/participant and other personal data at all relevant points throughout the process as needed for legal and regulatory compliance.

The win condition determination module 250 monitors 350 the user's progress toward the win condition for the challenge to determine if and when the user at least meets the win condition based on the received in-content engagement statistics from the third-party content provider computing system 130. In one embodiment, a win condition, also known as a victory condition, may be the game state that must be reached to establish the order of finish in a particular challenge, game, or tournament. Win conditions may relate to specific achievements within the game, such as competing Level 2, defeating 250 of a specific type of enemy, timed runs, certain point totals, collection of certain items, or other achievements. Accordingly, in response to the user at least meeting the win condition, the win condition determination module 250 providing the user with the prize associated with the win condition.

The in-content challenge platform may identify 360 an in-content challenge met by the user based on the user actions satisfying the challenge criteria. The in-content challenge platform sends 370 a dynamically generated message to the client device of the user. The dynamically generated message may be associated with a reward for the user.

The web server 260 links the in-content challenge platform 105 via the network 150 to the one or more client devices 110, as well as to the one or more third-party content provider computing systems 130 and one or more sponsor systems 140, as described with respect to FIG. 1. The web server 260 serves web pages, as well as other content, such as JAVA®, FLASH®, XML and so forth. Additionally, the web server 260 may provide application programming interface (API) functionality to send data directly to native client device operating systems, such as IOS®, ANDROID™, or BlackberryOS.

The message generation module 270 generates individualized messages for consumers using symbolic artificial intelligence and/or machine learning based on parameters entered by an entity, for example, a content provider. The parameters may describe permanent and temporary characteristics of the users, for example, participants of online games. The parameters may represent aggregate information describing the organization or a set of users, for example, aggregate characteristics of users that satisfy certain targeting criteria. Thus, the message generation module 270 dynamically generates a message that can be presented to a consumer. When a consumer selects a message, a message is created and is then available for distribution to the consumer. The message's existence and value are factored into the limit calculations governing the offering and may impact future messages. Generated messages may be revoked prior to redemption and the limit calculations are then updated to reflect the availability of quantity and funds. When messages are redeemed, information about the use is recorded and additional use of the message is prevented. Messages are generated with a system of goal of maximizing message selection and redemption while minimizing message value. Reports can be generated for each offering campaign for the offering organization or entity showing overall effectiveness as well as detailed breakdowns of message selection and redemption.

The data store 280 may be used to store various types of in-content related information. The data store 280 may store user data and user characteristics, in-content challenge data including in-content challenge criteria, content data from the one or more third-party content provider computing systems 130, and so forth. The data may be stored so that users, developers, operators, facilitators, third party affiliates, or system administrators can have access to that user's game history for analytics purposes, data mining, fraud-prevention services, and so forth.

Generating Individualized Messages for Consumers

FIG. 3A shows a message campaign creation workflow. In one embodiment, message offering parameters are received by message generation module 270 (or a message server) from an organization or entity. These may be entered via a web based console, API, or other interface. Minimal parameters are needed, with many optional parameters allowed. The parameters include an identifier for the product such as UPC, SKU, or similar. In one embodiment, a limit for the offer in the form of total quantity or total spend can be applied. For example, a total quantity limit will produce messages until the quantity limit is met. A total spend limit will use the discount value on the messages produced to calculate the total spend and produce messages until the limit is met. In one embodiment, a campaign could be limited by time separately from or in addition to limits on quantity or spend. Additional messages would not be generated after the campaign end date. This date is the end of the message generation campaign, not to be confused with the expiration date of the message. In one embodiment, the messages may be location sensitive using geofencing. For example, specific regions of the world can be specified through either standard geopolitical borders or geofenced areas using geospatial coordinates.

Additionally, the campaign may have one or more goals used in maximizing or minimizing different aspects of the message and/or campaign. The list provided here are examples of goals the system could support but is not exhaustive. For example, the goals of a message/campaign may be to maximize visibility, minimum distribution. The offer may be designed to maximize exposure of the organization but minimize selection and/or distribution and/or redemption. The goal may be to maximize selection. The offer may be designed to maximize the number of times it is selected. Optionally, distribution and/or redemption could be minimized. The goal may also be to maximize distribution. The offer may be designed to maximize the number of times the messages are distributed. Optionally, redemption could be minimized. The goal may be to maximize redemption. The offer may be designed to maximize the number of redemptions. The goal may also be to minimize spend per message. The offer may be designed to minimize the spend per message while still meeting or maximizing other aspects.

In one embodiment, while not required to generate basic quantity limited offers, the MSRP may be required for total spend limits. This value is the manufacturer's suggested retail price and can be used by the message server to determine the value of an individual discount. A product with an MSRP of $10 and a discount of 50% has a discount value of $5. Zero or more photos can be provided in standard image formats. If more than one photo is provided, different photos will be chosen by the message server when generating the messages and factored into the possible messages created. If no photos are provided, the server will attempt to find photos on the internet using the product identifier (UPC, SKU, etc.). If no photos are available, offers will not be enhanced with photos of the product. A fall back to a logo for the organization or entity may be used instead.

In one embodiment, when these parameters are not set, the full range of 0% to 100% is used in message generation. These parameters can be used to increase the minimum discount or decrease the maximum discount. The actual discount for any individual message produced will be generated by the server based on all parameters, both explicitly entered and internal to the message server. In one embodiment, a specific expiration date can be set for the entire message offering or a relative expiration date can be set which can be used to generate an expiration date based on the date the message is generated. If no expiration date is specified, then the expiration dates for the messages is generated by the system and used as another factor in determining effectiveness of the messages. In one embodiment, an offer can be represented multiple ways even if they always are rooted in some percent discount. One or more styles can be chosen. If more than one is selected, the style is factored into message generation. For example, a product that has MSRP $10 and a discount of 25% may be represented as: 25% off, $2.50 off, priced at $7.50, and so forth.

In addition to the entered parameters, the message generation module 270 factors in a large number of additional parameters, many of which are based on permanent and temporary characteristics of the end consumer the message is generated for. The number of factors and characteristics that can be used in the generation process is large and may evolve over time. Listed here are some potential factors and characteristics but is not exhaustive. These parameters include the current location, age, past offer selections, past offer redemptions, and so forth of the customer. The current location of the user may be used in determining offer details based both on aggregate information about the region as well as specific history of the consumer. For example, certain regions may see high success rates with fairly low discount values (10%, 20%, etc.), while other regions may only see high success rates with high discount values (90%, 100%). In addition, the individual consumer may have varied opinions depending on current location and product. The specific location of the consumer may also impact which products are used in the presented message options. The past offer selections made by the consumer can be used as a factor in determining appropriate message offers for the consumer. The past offer redemption by the consumer can be used as a factor in determining appropriate message offers for the consumer. Further, when the message is presented as a prize that can be earned by completing a challenge or task, the characteristics of the challenge or task can be used in determining appropriate message offers.

When a message is created, additional metadata may be tied to the message capturing any number of additional characteristics that may be used for reporting on campaign effectiveness as well as impacting future message generation. The types of metadata recorded may evolve over time and this list is only an example of what may be recorded. For example, the metadata may include the timestamp of when the message was created, the location of the consumer when the message was created, an identifier of the consumer the message was created for, and permanent and/or temporary characteristics of the consumer that are known at the time the message was created.

When a message is redeemed, additional metadata can also be tied to the message capturing any number of additional characteristics that may be used for reporting on campaign effectiveness as well as impacting future message generation. The types of metadata recorded may evolve over time and this list is only an example of what may be recorded. For example, the metadata may include the timestamp of when the message was redeemed, the location of the consumer when the message was redeemed, an identifier for the organization where the message was redeemed, an identifier for the consumer that redeemed the message, the actual price of the product at the time of redemption, the actual value of the discount based on actual price of the product at the time of redemption, the total quantity of the product purchased at the time the message was redeemed, and/or the total price of the entire purchase made at the time the message was redeemed.

Messages may be redeemed at a variety of supported organizations ranging from e-commerce integrations to internet connected and enabled physical point of sale (POS) systems. A software enhancement or "plugin" can be used in supported e-commerce and POS systems. When a message is redeemed, the message generation module 270 can be contacted and the message is validated and information on the discount terms are returned. The message generation module 270 may also prevent message reuse and a message will return a validation error if multiple attempts to redeem the message are made. The entity fronting the value of the discount can be reimbursed the discount value of the message. Possible entities can be the organization executing the transaction or the consumer who may be paying full price and the discount value is then returned in rebate form.

Figure 5A:
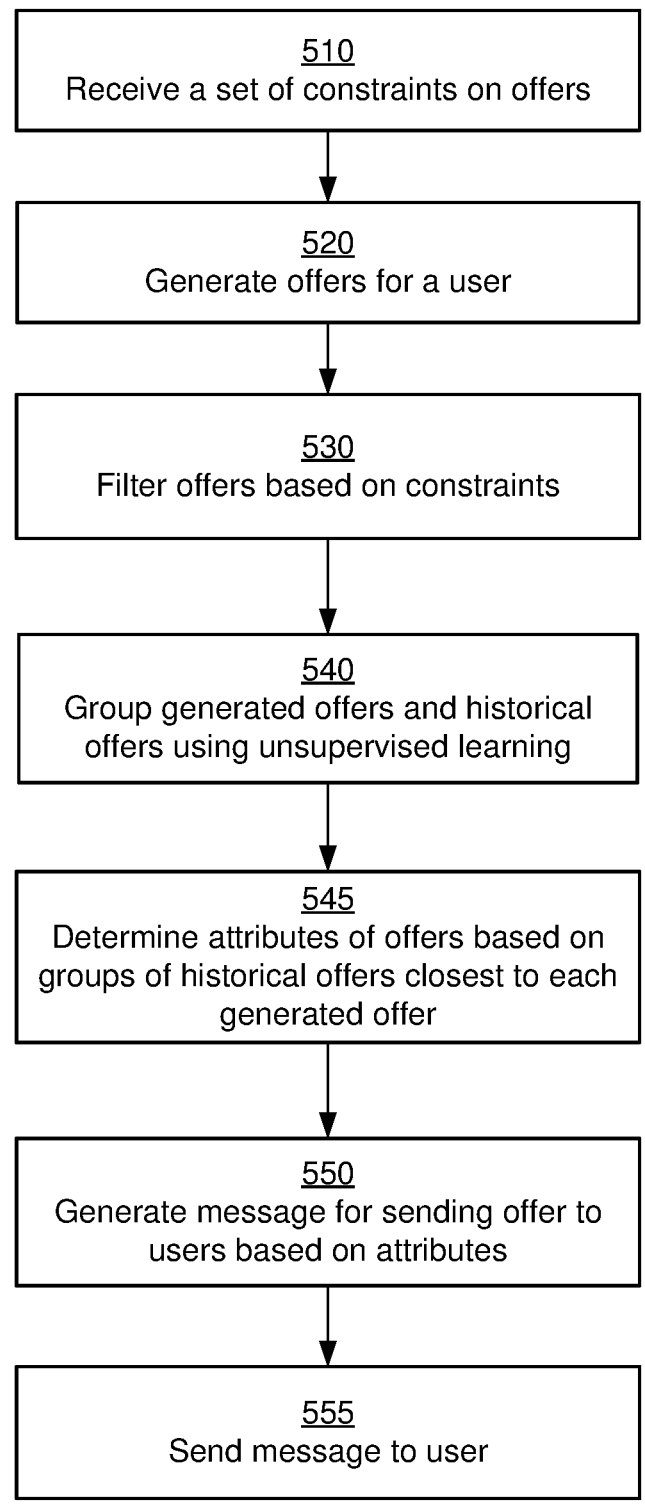
FIG. 5A is a flowchart of a process for generating messages corresponding to offers for users according to an embodiment.

FIG. 5A is a flowchart of a process for generating messages corresponding to offers for users according to an embodiment.

The in-content challenge platform 105 receives 510 constraints on offers from external systems, for example, external systems associated with organizations or entities such as content providers or advertisers. The constraints may represent limits on parameters specified by the external system, for example, a limit on the maximum spending based on cost associated with sending messages to users or a limit on the maximum number of messages sent to users. The in-content challenge platform 105 generates 520 offers for users. The offers may be generated based on random values of attributes. The offers may be generated by initializing values of attributes of offers to some default values. In an embodiment the attributes of offers may be initialized based on predetermined default values associated with categories of online games or categories of attributes of participants of online games or categories of attributes of content providers, for example, based on types of entities described in the content items such as products or services. An offer may be represented using a symbolic expression based on variables such that each variable represents an attribute associated with the offer such as a location where the offer is targeted, a value associated with the offer such as a percentage discount offered on a product, attributes of a media object used for presenting the offer via a user interface such as an image or video, and so on.

The in-content challenge platform 105 filters 530 generated offers based on constraints. For example, the in-content challenge platform 105 removes offers that may violate any constraint. The in-content challenge platform 105 groups 540 generated offers and historical offers together using unsupervised learning techniques. The in-content challenge platform 105 determines 550 attributes of offers based on groups of historical offers that are closest to each generated offer. Accordingly, aggregate values of characteristics of the cluster of offers may be used as characteristics of the generated offer. For example, a click through rate for a content item representing the offer is predicted based on a click though rate of the historical offers of the cluster. Similarly, certain attributes of the offer may be adjusted to correspond to the attributes of historical offers of the cluster closest to the offer. For example, the dimensions of an image or video presented to the users for presenting the offer are adjusted based on the dimensions of images/videos or other media objects of the historical offers.

In an embodiment, the in-content challenge platform 105 determines a centroid of each cluster and determines distance from a cluster as the distance from the centroid of the cluster. The in-content challenge platform 105 may determine the centroid as an aggregate value based on the data points of the cluster, for example, the mean value obtained for each dimension of the data points of the cluster. The in-content challenge platform 105 generates 560 messages for sending offer to a user based on the determined attribute and sends 570 the generated message.

In an embodiment, the message generation module 270 uses symbolic AI (artificial intelligence) to constrain generated offers based on the parameters and inputs from the organization or entity. An example of the logic is LOCATE (OFFER, CALIFORNIA)*(LOCATE(INPUT,CALIFORNIA)+LOCATE(INPUT,NEVADA))*FRAME(OFFER, PERCENT)*(FRAME(INPUT,PERCENT)+FRAME (INPUT,DISCOUNT_VALUE)), which represents an offer that fits the constraints of the inputs. Another example showing a generated offer that would be filtered out based on the input constraints is LOCATE(OFFER,ALABAMA)*(LOCATE(INPUT,CALIFORNIA)+LOCATE(INPUT,NEVADA)). In this example there are two relationships used, 'LOCATE' and 'FRAME'. The 'LOCATE' relationship is used to describe the relationship between a potential offer's location and the valid locations allowed in the coupon parameter input. The 'FRAME' relationship is used to describe the relationship between the potential offer's framing such as percent (i.e. 25% off) and the framing options allowed in the coupon parameter input. The symbol 'OFFER' represents the potential offer the system is trying to generate. The symbol 'INPUT' represents the set of constraining parameters set during coupon setup. Similarly, the other symbols 'CALIFORNIA', 'NEVADA', 'PERCENT', 'DISCOUNT_VALUE' represent different specific locations and framing types. The variable used in constraints maybe added over time to the system. As additional options and additional kinds of metadata is collected the system expands out the relationships and symbols further. Such symbols include specific symbols or categories of symbols like states, regions, countries, prizes, discount %, discount value, SKU numbers, win conditions, or even photos or videos which could be represented by symbols as well. In some embodiments, the system adds categories based on relationships discovered between symbols and outputs that result from the offers that the operator wants to optimize for (number of confirmed sales, for example, or number of attempts or clicks, for example). New categories of symbols emerge from the iterative processes of supervised or unsupervised learning as the system optimizes offer outputs. The system generates statistics describing various relationships and variables used in the constraints. The variables of historical offers that correlate with higher rate of success of the offer as measured by high redemption rate or higher click through rate are added to constraints. The values of these variables in the constraints are initialized to default values and adjusted through training. Accordingly, there is a relationship between the generated offer and the datum associated with all of the input elements of that offer.

A large number of characteristics and constraints have to be factored into the filter represented by the constraint symbolic expressions. The constraints used as a filter of the offers or content items generated may be initialized by a user, for example, a system administrator and are refined automatically. For example, one of the inputs from the operator is a set of images that could be used for coupons. The set of images is initialized to all images provided by an operator. However, after further iterations, as coupons are selected and redeemed, the images are ranked based on the user interactions and likelihood of user redeeming an offer. Accordingly, some images are eliminated from the set and other images are retained in the set. The set of valid choices of images is thereby reduced making the filter more restrictive. As a result, some generated offers are no longer able to satisfy the constraints. The types of these initial inputs could include any number of things such as the images, the framing style of the offer (25% vs $2.50 off), location, redemption style (i.e. online vs in store), discount amount (could start as a wide range but the range is narrowed via feedback in future iterations). When the offer is used as a prize in a contest, additional inputs are factored in, for example, the target difficulty of the challenge used to win the coupon, style of content (game, exercise, video, etc), sub-style of content (first person shooters, strategy, casual, etc), or any number of other characteristics of the end presentation environment of the coupon. The volume of factors that can be used by the system combined with the fact that some factors can be changed or added based on past performance of earlier iterations of the coupons, makes the system complex and dynamic. This makes the use of conventional techniques such as hard coded if-then-else statements for performing conditional checks in source code difficult to manage and maintain. Therefore use of an inference engine according to various embodiments allows the system to be adaptive and extensible without requiring the source code to be modified and executable code to be reinstalled frequently.

Using an unsupervised learning engine, the system groups both generated offers as well as historical offers included in generated messages along with their metadata attributes. The system may generate offers and messages for specific users or for categories of uses based on attributes describing users, for example, users from a specific location, users of particular gender, users of particular age group, or combinations of various user attributes. The system generates messages that contain not only the attributes of the offer, but also the attributes of the user for whom the offer was generated. The system may generate messages that include attributes of the specific gaming actions that the user performed, for example, the message may indicate that since the user satisfied a specific win condition by achieving specific actions within the online game, the user is presented a reward. The historical offers and messages have definitive results as far as selection, distribution, and redemption. Messages are recommended for the specific consumer using the supervised learning engine.

The groups of historical offers provide the training data for the machine learning models, the success and failure cases used in adjusting inputs into the offer generation process. This feedback loop drives the offer optimization as the system works towards achieving the goals created during offer setup. The groups of generated offers are all of the possible offers that could be shown to the end user and the system may either show them all or select a smaller sample, for example, a single offer, based on the goals the system aims to achieve. For example, the system may have two driving goals for a campaign. One goal may be to maximize redemption of the offers and another goal of the campaign may be to minimize the discount offered. Accordingly, the system aims to have the highest redemption rate as well as the lowest cost to the prize provider. The system starts with a wide set of possible offers based on the input parameters and chooses a limited number of offers to expose to the end user. The system tracks the actions performed by the user. If the user ignores an offer, the system associates the user interaction with a failure of the offer and downgrades the offer by reducing a score assigned to the offer representing the importance or relevance of the offer. If the user selects an offer, the system associates that user interaction with a partial success towards the goal and upgrades the offer by incrementing the score representing the importance or relevance of the offer. The user may either redeem the offer or not. If the user does not redeem the offer, the system associates the user action with a failure of the offer, thereby downgrading the offer. However, since the offer was selected by the user, the amount by which the score associated with the offer is reduced is smaller than a comparable offer that was never selected by the user. If the user redeems the offer, the system treats the user interaction as a success and upgrades the offer. The system may further modify the inputs to try and achieve the other goal of minimizing the discount. This process is a repetitive cycle where the system continually provides feedback to improve the offer generation. The supervised learning engine is supervised by the actions of the end user. The unsupervised learning engine according to some embodiments, uses raw inputs and finds combinations of attributes for the offers before the feedback loop kicks in.

Figure 5B:
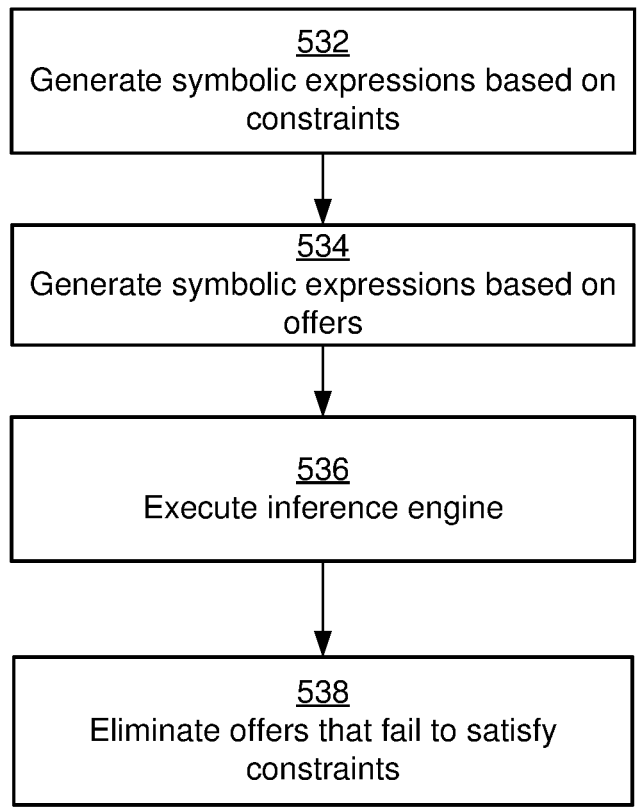
FIG. 5B is a flowchart of a process for filtering offers that fail to satisfy constraints according to an embodiment.

FIG. 5B is a flowchart of a process for filtering offers that fail to satisfy constraints according to an embodiment. The in-content challenge platform 105 generates 532 symbolic expressions describing the constraints for messages including offers. These symbolic expressions may be referred to as constraint symbolic expressions. The constraints may specify limits on various attributes of the message, for example, the permitted locations for the offer (e.g., the states where the offer is valid), the units used for describing the offer (as absolute values or percentages), the size of the image used for presenting the offer, a set of images for selecting from for the offer, the attributes of online games that should be targeted for the offer, the types of actions performed by the user within games that should be used as win condition for the offer, the attributes of users that should be targeted using the offer (age, gender, ethnicity, and other demographic attributes).

The in-content challenge platform 105 generates a set of offers for including in generated messages. In an embodiment, the offer generated is a coupon. The in-content challenge platform 105 generates symbolic expressions describing the offers. A content item is generated based on the offer for sending as a message to a participant of the online game. Therefore, these symbolic expressions are also referred to as content symbolic expressions. The content symbolic expression represents various attributes of the potential content item (or message) that may be generated based on the offer, for example, the location for which the offer is generated, the product for which the offer is generated, the amount of the offer (e.g., the percentage value of discount that is offered, the size or dimensions of an image used for the offer, and so on. The attributes used to describe the offer typically match the attributes used to specify the constraints.

The in-content challenge platform 105 executes an inference engine to determine whether each generated offer is valid in view of the constraints. In an embodiment, the inference engine is a forward chaining and backward chaining inference engine, for example, an inference engine of a logic programming language such as prolog. The inference engine applies logical rules to a knowledge base to deduce new information. The knowledge base comprises the symbolic expressions described herein, for example, the constraint symbolic expressions and content symbolic expressions. The inference engine applies logical rules to the knowledge base and may deduce new information, for example, facts representing whether a content symbolic expression violates a constraint. This process iterates as each new fact added to the knowledge base could trigger additional rules in the inference engine. Inference may perform forward chaining or backward chaining. Forward chaining starts with the known facts and asserts new facts. Backward chaining starts with goals and works backward to determine what facts must be asserted so that the goals can be achieved. A goal of the system is to determine whether a content symbolic expression violates a constraint. The inference engine may assume that a content symbolic expression does not violate any constraint and apply various logical rules to determine whether the assumption is true or false. Examples of logical rules include (1) if location of the content symbolic expression is not included in the permitted locations of a constraint, the content symbolic expression violates the constraint; (2) if the dimensions of content item expected to be presented via a user interface as specified by the content symbolic expression are larger than the maximum dimensions specified by a constraint symbolic expression, the content symbolic expression violates the constraint. In an embodiment, the constraints are grouped into sets of constraints. The system determines whether a content symbolic expression satisfies all constraints of the set even if it violates one or more constraints of other sets. Each set of constraints may be associated with specific targets, for example, specific online games, specific categories of participants, and so on. Accordingly, the content symbolic expression may be used for the targets associated with the set of constraints that are satisfied by the content symbolic expression and may not be used for targets associated with a set of constraints that is not satisfied by the content symbolic expression.

In an embodiment, the sets of constraints form a hierarchy such that a set S1 may include other sets S2, S3, S4 and a set may be included in a set S0. The inference engine performs forward chaining to determine facts indicating whether a content symbolic expression satisfies a particular set of constraints. If multiple facts are added to the system indicating that all subsets (e.g., S2, S3, S4) of constraints of a set S1 are satisfied by a content symbolic expression, the inference engine further deduces by performing forward chaining that the set S1 of constraints is satisfied by the content symbolic expression.

In an embodiment, the inference engine is a rule based expert system that generates new symbolic expressions based on rules from the symbolic expressions specifying the offers. The new offers are generated until the system arrives at a value true or false indicating that the offer is valid or invalid. For example, if the offer has a location L and there is a constraint that specifies a set of locations that does not include the location L, the offer is invalid. Similarly, if the offer specifies a discount of 25% and a constraint specifies that the range of valid discounts is 5-20%, the offer is declared invalid since the discount percentage falls outside the range specified by the constraints. Accordingly, the system filters out offers by eliminating offers that fail to satisfy one or more constraints.

Figure 5C:
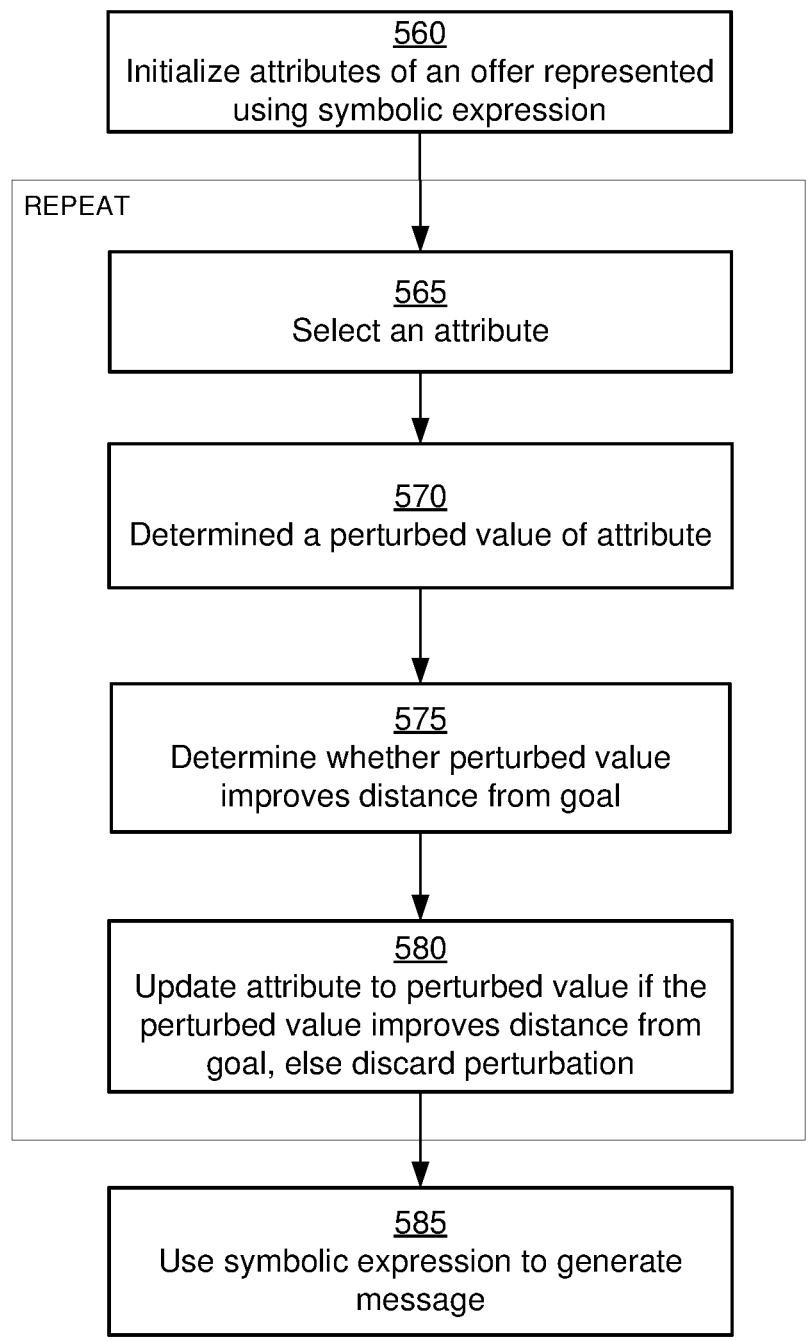
FIG. 5C is a flowchart of a process for generating offers based on symbolic processing according to an embodiment.

FIG. 5C is a flowchart of a process for generating offers based on symbolic processing according to an embodiment. The in-content challenge platform 105 initializes 560 attributes of an offer using a symbolic expression and iteratively improves upon the offer to generate a better offer. The in-content challenge platform 105 uses a measure of quality of the offer representing how good the offer is. In an embodiment, the measure of quality of the offer is based on the distance from the closest cluster determined based on the unsupervised learning process. For example, less distance is indicative of higher quality of message since it is similar to messages that were previously identified as good or acceptable.

The in-content challenge platform 105 repeats the following steps 565, 570, 575, and 580. The in-content challenge platform 105 may repeat the steps for a predetermined number of iterations. Alternatively, the in-content challenge platform 105 may repeat the steps until the measure of quality falls within a predetermined threshold value, for example, until the offer is within a threshold distance of the closest cluster.

The in-content challenge platform 105 selects 565 an attribute of the offer based on the symbolic expression. The in-content challenge platform 105 determines 570 a perturbed value of the attribute by modifying it by a small amount. The in-content challenge platform 105 determines 575 whether the perturbed value improves the measure of quality of the offer, for example, whether the perturbation decreases the distance from the centroid of the cluster, If the perturbation improves the quality of the offer, the in-content challenge platform 105 updates the attribute to the new value based on the perturbation. If the perturbation makes the quality worse, the in-content challenge platform 105 discards the perturbation and continues with the next iteration. Once the iterations are complete, the in-content challenge platform 105 generates 585 an offer based on the final symbolic expression and send the generates offer. Accordingly, the in-content challenge platform 105 performs a search for a suitable offer in a multidimensional space of attributes to find an offer that has high quality.

Figure 6:
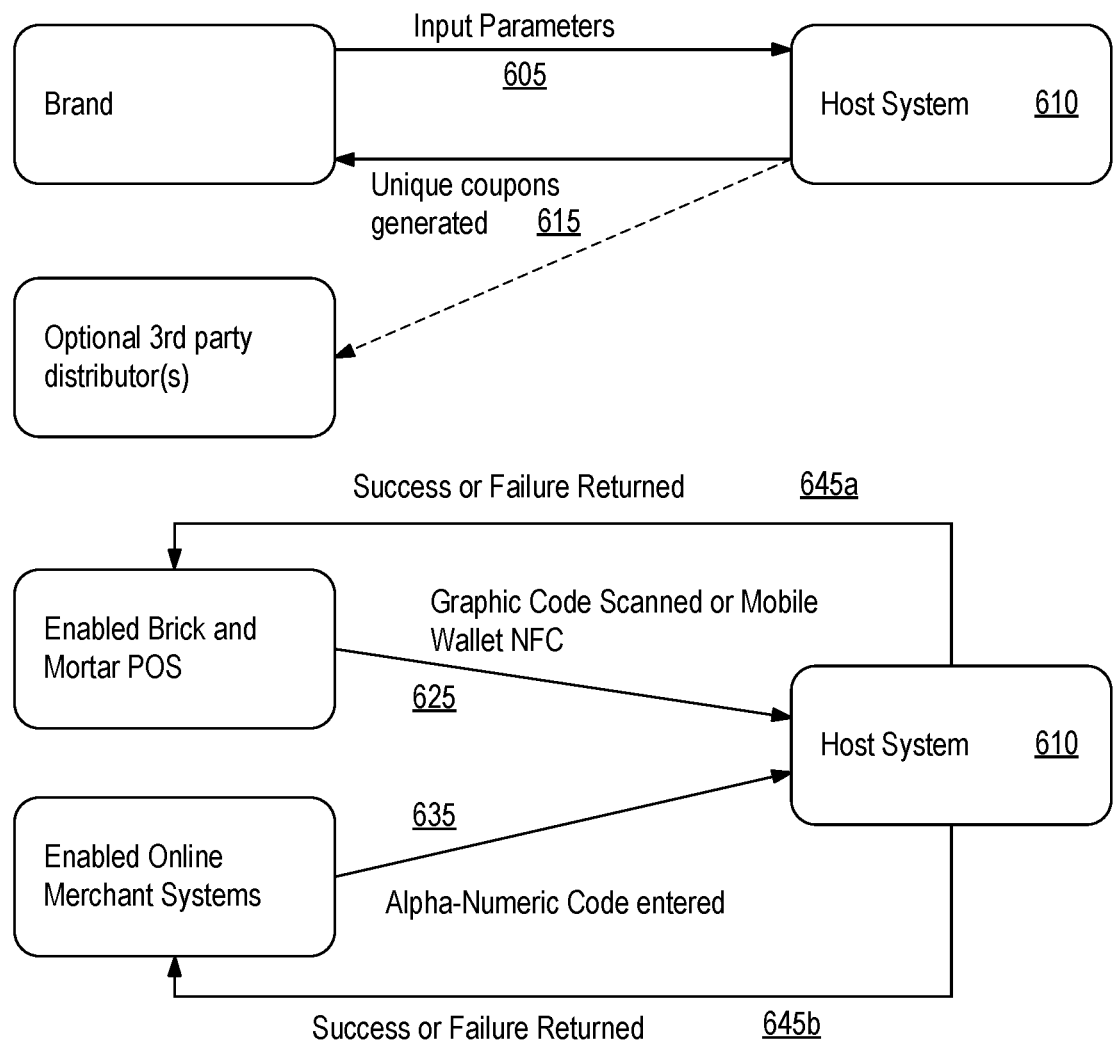
FIG. 6 illustrates an example message lifecycle, in accordance with an embodiment.

FIG. 6 is an example message lifecycle, in accordance with an embodiment. The host system 610 receives 605 input parameters describing constraints specified by the brand owners. The host system 610 sends 615 unique messages, for example, messages generated to the brand owners or to third party system for distribution. The host system 610 receives 625 information describing redemption of the coupons, for example, graphic code scanned or mobile wallet NFC (near field communication) from enabled brick and mortar point of sale locations. The host system 610 may receive 635 alphanumeric code entered at enabled online systems. The host system 610 reports 645 success or failure.

Process Flow for Providing Dynamic Messages

Figure 7:
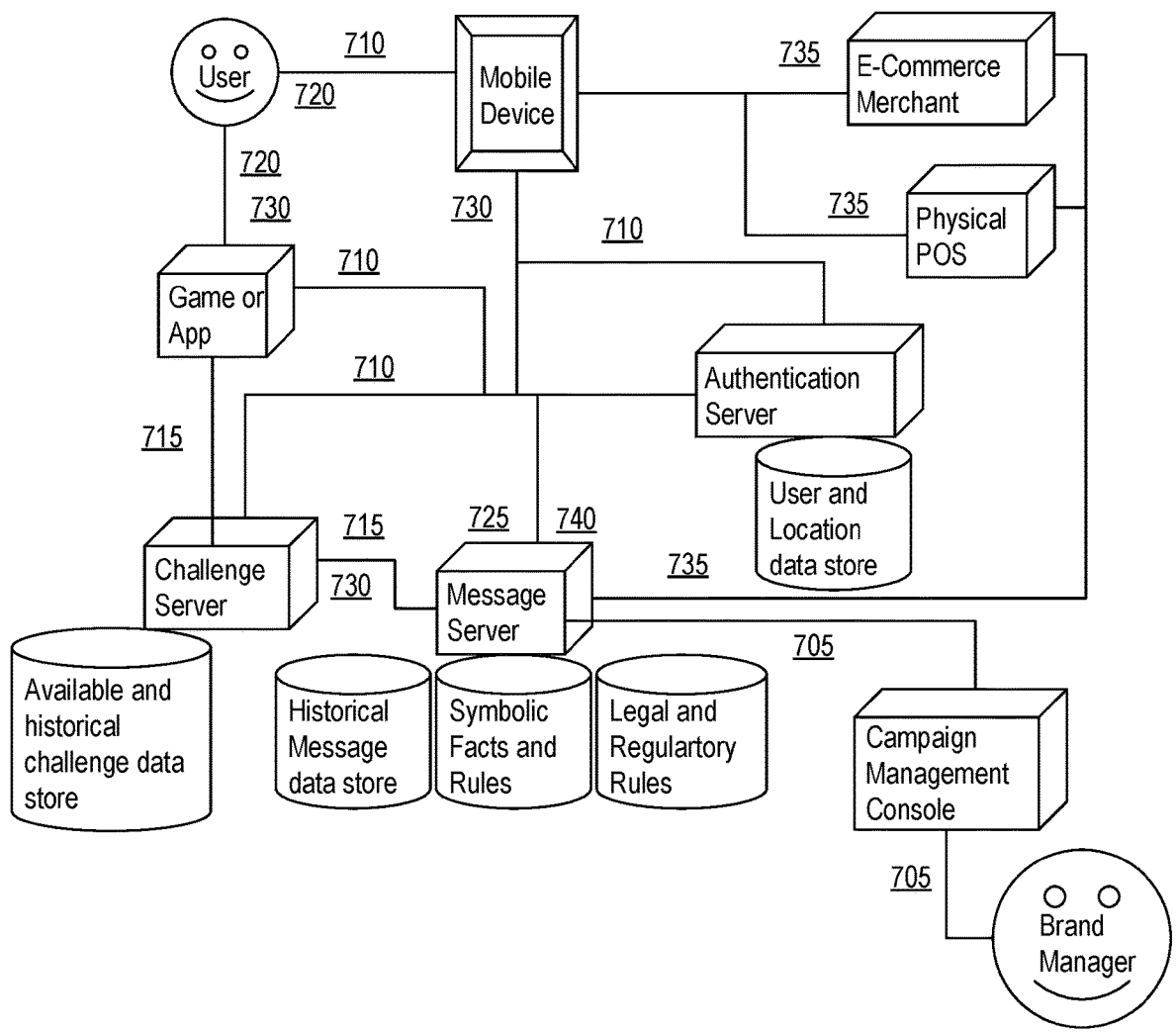
FIG. 7 is a process flow diagram for providing dynamic messages, in accordance with an embodiment.

FIG. 7 is a process flow diagram for providing dynamic messages, in accordance with an embodiment. Referring to the process flow diagram of FIG. 7, a user uses 705 campaign management console to enter, monitor, and analyze efficacy of campaigns. The user authenticates 710 with location via mobile device handshaking with authentication server, challenge server, and the game or application. A list of offers and challenges is generated 715 dynamically customized for the user based permanent and temporary characteristics of the user and the entire user population at large. The user views 720 the list of offers and challenges in game, application, or mobile device and makes a choice of the desired offer. A message is generated 725 for the user and held pending distribution. The user interacts 730 with Game or application to make progress towards earning the message with progress tracked by the challenge server. In one embodiment, the message contains a dynamically generated coupon for the user. Accordingly, the user completes 730 the challenge successfully and the message is distributed to the user via mobile device, email, or other mechanism. Alternatively, the user fails to complete 730 the challenge successfully and the message is revoked with only the historical record kept for use in future reward generation. The user redeems 735 the message at an e-commerce website or physical POS. Reward validation and tracking achieved via communication with the offer server. The lifecycle of the message is recorded 740 and factored into future message generation for the user and the entire user population at large.

In one embodiment, an inference engine, for example, an Expert System where one of the operators (platform operator, system administrator, campaign creator) adjusts the production rules to optimize for a particular outcome, are used to creating both an improved experience for the end user by at least providing them with more relevant content, offers, and rewards. In an embodiment, the operators of the expert system adjust the rules, for example, in response to an emergent goal, or possibly to attempt to limit non-desirable outputs (money-losing offers, for example). The rules include hard limits on the various parameters such as minimum and maximum discount and any of the other listed parameters. The rules include the goals for the offer. These goals drive the system as it generates potential offers. These goals, and the constituent rules are adjusted by operators in the expert system.

In particular, symbolic AI produces a better, clearer set of outputs on the performance of each message by showing how each symbol, relationship, and set of propositional logic claims had performed against a known criteria (for example: click through rate, win rate, or end transaction rate.). The system executes the inference engine for several users and offers and collect statistics. For example, the system collects statistics describing click through rate, win rate, end transaction rate, and so on across a plurality of offers and a plurality of users. The system determines statistics for individual components used in the inference engine including the specific types of symbols, specific types of relationships, and so on.

Compared to existing content creation systems, and in particular prize creation systems for contests, sweepstakes, etc., this method, driven by AI (either symbolic with propositional logic and expert systems, or Neural net, deep learning or similar) produces improved outcomes for end users (e.g., more relevant personalized content) and for brands/prize providers. For example, existing systems are limited based on assumptions provided by prize provider managers that have little influence from data. When those campaigns do involve data, it's the collected data from across multiple past campaigns ("what discounts worked in our last black Friday sale?"). Accordingly, the disclosed system allows data to be gathered and used within each campaign in real-time. The state of the business in campaign creation is to create large batch sizes of the same message and test their efficacy across different regions/demographics/deployments (where that data is available—it often is not). A-B testing can be done but it is done in the same way with "brute force" creating large batch sizes of two or three or four offers (all of which have the full weight, creation cost, and financial exposure of "real" or "physical" rewards) and comparing the outcomes weeks/months later as they are redeemed at points of sale.

Accordingly, in contrast, the disclosed system can categorize various elements of a prize, an associated campaign, a campaign goal, and an individual participant into a series of symbols (typically nouns) and relationships (typically verbs or adjectives) and build out "truth tables" that allow for an advanced AI to create individually tailored offers based on symbols like product name, discount amount, and eligibility criteria, as well as relationships like win condition, the particular content where the offer is placed, the images used in the offer, the age of the participant, and the location of the participant. Those offers would then become messages at the point where a participant selects them as their chosen prize from within their UI in their particular game or application (a material change from current methodology as people skilled in the art would acknowledge) and they remain online vouchers, valid in the system, until they are redeemed at point of sale, or until the participant fails to earn them/collect them as a function of their in-game achievements. In this case, the prize batch size could be one (or even zero) but still produce incredible amounts of useful, actionable data that can help brands right away, even in the midst of a single campaign.

For example, one embodiment of this system a brand might want to cap their campaign spend at $10,000—or even $1,000, or $50. On one side of the system, the UI for this system would allow a campaign creator to input a product name/UPC/SKU, define the max campaign spend, the determine a goal output. The system would then prioritize the symbols and relationships in each offer (including, but not limited to, a discount rate, a content item, the states where the reward is valid, the participant's past behavior, the participant's age, the participant's location, the device the participant is using, the legal and regulatory requirements of the challenge/sweepstakes, whether the prize was a giveaway or a discount, what images will be shown on the offer, what the win condition is that the participant would have to complete to earn the reward, etc.) and manipulate each of those symbols, relationships, and connectors using propositional logic/Boolean logic or other similar method to create a series of offers. Participants would see those offers, paired with the win conditions that a participant would have to accomplish to win those offers (another unique step in this campaign creation system). Participants would choose from among the offers, and then in some embodiments they would have to accomplish the win condition to earn the reward. In this example "earned reward" would then be recorded and all subsequent offers adjusted to account for the new weights of the variables.

Given the extraordinary number of elements (certainly not infinite, but very large) and the fixed campaign spend that is a parameter of the system, symbolic AI is an optimal choice for this type of prize creation system. On one side, the offers must be optimized, and on the other, the spend limit cannot be exceeded. This is a problem that brute force cannot adequately solve. Further, the outputs of symbolic AI can be tracked, unlike deep learning or neural net AI that has unseen layers, and this is not helpful to the users and other content providers who are also attempting to learn from past campaigns.

One of the key outputs of this system is a visible analytics output that shows the campaign creator the efficacy of each offer, along with all of the variables associated with that offer. This system can show which variables were manipulated, which offers were clicked on at what rates in what content and where and by whom. All of this data, categorized in this way, would be valuable to campaign creators and prize providers for future offers and as a way to understand more about their users—expanding their customer base, reaching new users that are difficult to reach with current methods, and doing it all with minimal waste and optimized ad spend.

Example User Interfaces

FIG. 8A is an example prize creation dashboard for a message campaign, in accordance with an embodiment. The user interface 810 allows a user to enter information describing potential rewards for users. These include images, description, product details such as SKU. MRSP, limits associated with the rewards, and other attributes. The dashboard may be presented to a system administrator or an expert user associated with a content provider that wants to use the in-content challenge platform for providing dynamic content such as messages including offers to users.

FIG. 8B is a first example screenshot of a message campaign creation dashboard, in accordance with an embodiment. The user interface 810 provides information describing a campaign. These include images, description, and redemption procedure for the rewards, and so on.

FIG. 8C is a second example screenshot of a message campaign creation dashboard, in accordance with an embodiment. The user interface 830 allows a user to identify parameters for targeting users including online games being targeted, geographical locations being targeted, and so on.

Figure 8D:
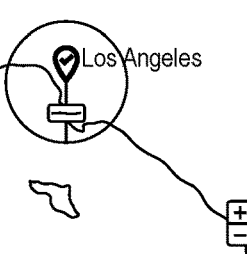
FIG. 8D is a third example screenshot of a dashboard, in accordance with an embodiment.

FIG. 8D is a third example screenshot of a message campaign creation dashboard, in accordance with an embodiment. The user interface allows users to search for specific locations for targeting.

Figure 9:
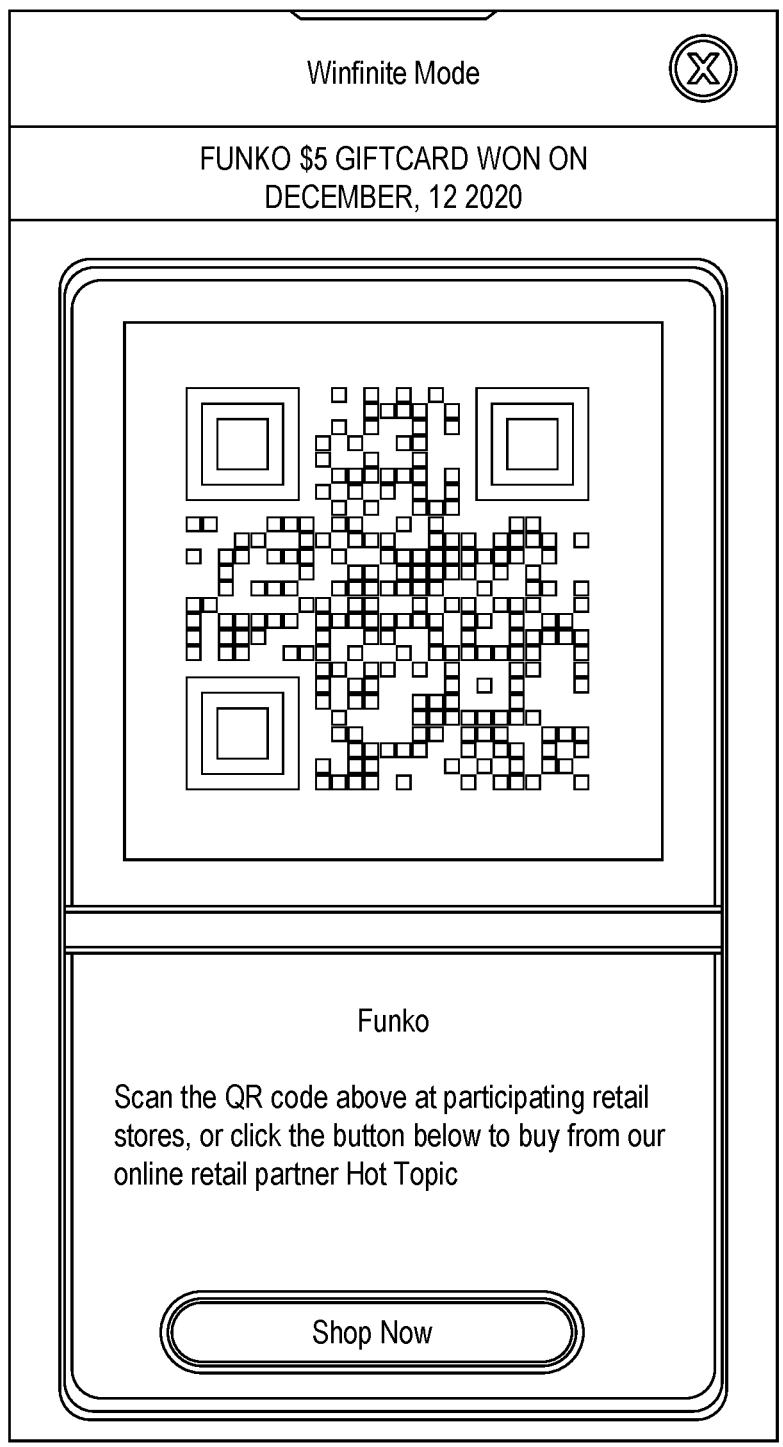
FIG. 9 is an example dynamic message generated by the in-content challenge platform, in accordance with an embodiment.

FIG. 9 is an example dynamic message, in accordance with an embodiment. The message provides information describing a reward that a user has won. The message may include an image showing a product or an image describing a service that the user may have received in reward. The user interface presents a QR code that can be scanned for redemption of the reward.

Technological Improvements

The in-content challenge platform uses symbolic processing to generate dynamic messages including offers and determine whether an offer satisfies constraints using symbolic artificial intelligence based on symbolic processing and propositional logic based inference engine. The user of symbolic processing allows the system to express large numbers of attributes of messages and offers including participant attributes comprising temporary and permanent characteristics, attributes of online games for which the message is being generated, attributes or rewards being offered, attributes of locations, temporal attributes, and so on.

The attributes that affect the dynamic messages may be evolving over time. For example, new content providers may provide new attributes, new online games may have new attributes, and so on. As a result, conventional techniques for generating messages require significant amount of manual efforts in generating the messages. Even if the messages are generated programmatically, conventional programs used for generating messages are based on hard coded rules and if-then-else statements. As a result, these programs are inflexible.

Any changes to the underlying entities and their attributes, for example, user attributes, online game attributes, or reward attributes require the program to be rewritten and deployed again. The user of symbolic processing makes the program for generating the messages highly extensible. Any number of symbolic expressions can be added and new attributes added to existing symbolic attributes. The changes can be made at run time without even shutting down the system. This is important for an in-content challenge platform that deals with large number of online games as well as content providers that may change over time.

Embodiments provide an architecture that is dynamic in nature and easy to extend without having to upgrade the code or having to reinstall/redeploy any executable code as a result of structural changes to underlying entities such as online games, participant characteristics, reward characteristics, and so on. Furthermore, the system allows on the fly changes to messages generated, thereby providing a much larger variety of messages to users than is possible via a conventional architecture based on hard coded messages.

Example Computer System

Figure 10:
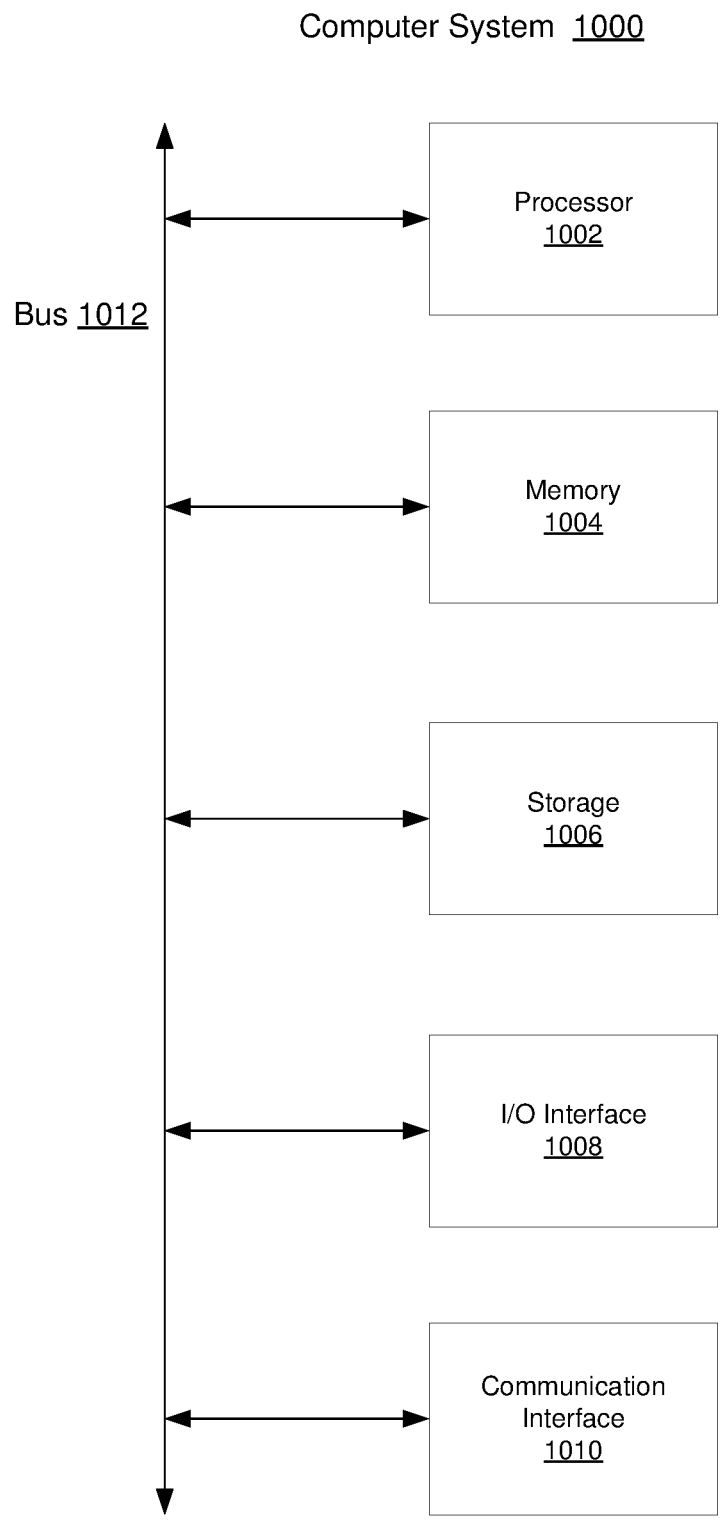
FIG. 10 shows an example computer system, in accordance with various embodiments.

FIG. 10 illustrates an example computer system, in accordance with one or more embodiments. Computer system 1000 includes a processor 1002, memory 1004, storage 1006, an input/output (I/O) interface 1008, a communication interface 1010, and a bus 1012.

Processor 1002 includes hardware for executing instructions, such as those making up a computer program. For example, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. Processor 1002 may include one or more internal caches for data, instructions, addresses, or any suitable number of internal caches.

Memory 1004 includes main memory for storing instructions for processor 1002 to execute or data for processor 1002 to operate on. For example, computer system 1000 may load instructions from storage 1006 or another source to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results to the internal register or internal cache. Processor 1002 may then write one or more of those results to memory 1004. In some embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In some embodiments, one or more memory management units (MMUs) reside between processor 1002 and memory 1004 and facilitate accesses to memory 1004 requested by processor 1002. In some embodiments, memory 1004 includes random access memory (RAM). This RAM may be volatile memory. This RAM may be dynamic RAM (DRAM) or static RAM (SRAM). Moreover, this RAM may be single-ported or multi-ported RAM.

Storage 1006 includes mass storage for data or instructions. For example, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media. Storage 1006 may be internal or external to computer system 1000. In some embodiments, storage 1006 is non-volatile, solid-state memory. In some embodiments, storage 1006 includes read-only memory (ROM). This ROM may be mask-programmed ROM, programmable ROM (PROM), erasable PROM (EPROM), electrically erasable PROM (EEPROM), electrically alterable ROM (EAROM), or flash memory or a combination of two or more of these. Storage 1006 may include one or more storage control units facilitating communication between processor 1002 and storage 1006.

I/O interface 1008 includes hardware, software, or both providing one or more interfaces for communication between computer system 1000 and one or more I/O devices. Computer system 1000 may include one or more of these I/O devices. One or more of these I/O devices may enable communication between a person and computer system 1000. For example, an I/O device may include a keyboard, keypad, game controller, microphone, monitor, mouse, printer, scanner, speaker, still camera, stylus, tablet, touch screen, trackball, video camera, another suitable I/O device or a combination of two or more of these. An I/O device may include one or more sensors. I/O interface 1008 may include one or more device or software drivers enabling processor 1002 to drive one or more of these I/O devices.

Communication interface 1010 includes hardware, software, or both providing one or more interfaces for communication (such as, for example, packet-based communication) between computer system 1000 and one or more other computer systems 1000 or one or more networks. For example, communication interface 1010 may include a network interface controller (NIC) or network adapter for communicating with an Ethernet or other wire-based network or a wireless NIC (WNIC) or wireless adapter for communicating with a wireless network, such as a WI-FI network. For example, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks. Communication interface 1010 may include one or more communication interfaces 1010.

Bus 1012 includes hardware, software, or both coupling components of computer system 1000 to each other. For example, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1012 may include one or more buses 1012.

A computer-readable storage medium encompasses one or more non-transitory, tangible computer-readable storage media possessing structure. For example, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these. A computer-readable non-transitory storage medium may be volatile, non-volatile, or a combination of volatile and non-volatile.

In some embodiments, a computer-readable storage medium implements one or more portions of processor 1002 (such as, for example, one or more internal registers or caches), one or more portions of memory 1004, one or more portions of storage 1006, or a combination of these. In some embodiments, a computer-readable storage medium implements RAM or ROM. In some embodiments, a computer-readable storage medium implements volatile or persistent memory. In some embodiments, one or more computer-readable storage media embody software. Software may encompass one or more applications, bytecode, one or more computer programs, one or more executables, one or more instructions, logic, machine code, one or more scripts, or source code, and vice versa. In some embodiments, software includes one or more application programming interfaces (APIs). In some embodiments, software is expressed as source code or object code. In some embodiments, software is expressed in a higher-level programming language, such as, for example, C, Perl, or a suitable extension thereof. In some embodiments, software is expressed in a lower-level programming language, such as assembly language (or machine code). In some embodiments, software is expressed in JAVA. In some embodiments, software is expressed in Hyper Text Markup Language (HTML), Extensible Markup Language (XML), or other suitable markup language. In some embodiments, software is expressed in ruby-on-rails, Node.js, Python, Scala, or Unity.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

We claim:

1. A computer-implemented method for providing content associated with online games, comprising:
   receiving, by an in-content challenge platform, a plurality of in-content challenges, each in-content challenge specifying an in-content challenge criterion based on actions performed by participants of online games;
   receiving, by the in-content challenge platform, information indicating launching of an online game by a client device of a participant;
   executing a machine learning based model configured to receive as input, information describing user actions performed by a particular user in a particular online game and predicting a likelihood of the particular user meeting an in-content challenge in the particular online game;
   identifying, by the in-content challenge platform, one or more in-content challenges that the participant is likely to meet based on predictions of the machine learning model;
   initializing an action score for the participant for each matching in-content challenge;
   repeatedly performing following steps until an in-content challenge is met by the participant:
      receiving, by the in-content challenge platform, event data indicating an action performed by the participant within the online game;
      identifying an in-content challenge associated with the action;
      updating the action score for the identified in-content challenge based on a value associated with the action;
      responsive to updating the action score, determining whether the identified in-content challenge is met by the participant; and
   responsive to participant meeting at least one in-content challenge, generating a content item for the participant; and
   transmitting the generated content item to the client device of the participant.

2. The computer-implemented method of claim 1, further comprising:
   transmitting to the client device of the participant, information describing a measure of progress of the participant for one or more in-content challenges.

3. The computer-implemented method of claim 1, further comprising:
   ranking a list of in-content challenges based on an amount of progress made by the participant for each in-content challenge; and
   transmitting to the client device of the participant, the ranked list of in-content challenges.

4. The computer-implemented method of claim 3, further comprising:
   periodically updating the ranked list of in-content challenges based on actions performed by the participant; and
   transmitting the updated ranked list of in-content challenges.

5. The computer-implemented method of claim 1, wherein an in-content challenge is met by performing actions by the participant across a plurality of sessions of the online game, the method further comprising:

storing action scores based on actions performed by the participant during one or more sessions; and loading the action scores determined based on the actions performed by the participant during the one or more sessions for a subsequent session.

6. The computer-implemented method of claim 1, wherein an in-content challenge is met by performing actions by the participant across a plurality of online games, wherein the online game is a first online game, the method further comprising:

storing action scores based on actions performed by the participant during a session for the first online game; and loading the action scores determined based on the actions performed by the participant during a new session for a second online game.

7. The computer-implemented method of claim 1, wherein an in-content challenge is met by actions performed by a plurality of participants.

8. The computer-implemented method of claim 1, wherein information indicating launching of the online game includes one or more of: memory usage, CPU usage, software logs, internet transmissions, or hard drive operations.

9. A non-transitory computer readable storage medium comprising stored instructions that when executed by a computer processor cause the computer processor to:

receive, by an in-content challenge platform, a plurality of in-content challenges, each in-content challenge specifying an in-content challenge criterion based on actions performed by participants in online games;

receive, by the in-content challenge platform, information indicating launching of an online game by a client device of a participant;

execute a machine learning based model configured to receive as input, information describing user actions performed by a particular user in a particular online game and predict a likelihood of the particular user meeting an in-content challenge in the particular online game;

identify, by the in-content challenge platform, one or more in-content challenges that the participant is likely to meet based on predictions of the machine learning model;

initialize an action score for the participant for each matching in-content challenge;

execute further instructions until an in-content challenge is met by the participant the further instructions when executed cause the computer processor to:

receive, by the in-content challenge platform, event data indicating an action performed by the participant within the online game;

identify an in-content challenge associated with the action;

update the action score for the identified in-content challenge based on a value associated with the action;

determine whether the identified in-content challenge is met by the participant based on the value associated with action; and generate a content item for the participant when the participant meets at least one in-content challenge; and transmit the generated content item to the client device of the participant.

10. The non-transitory computer readable storage medium of claim 9, further comprising stored instructions that when executed cause the computer processor to:

transmit to the client device of the participant, information describing a measure of progress of the participant for one or more in-content challenges.

11. The non-transitory computer readable storage medium of claim 9, further comprising stored instructions that when executed cause the computer processor to:

ranking a list of in-content challenges based on an amount of progress made by the participant for each in-content challenge; and transmitting to the client device of the participant, the ranked list of in-content challenges.

12. The non-transitory computer readable storage medium of claim 11, further comprising stored instructions that when executed cause the computer processor to:

update periodically the ranked list of in-content challenges based on actions performed by the participant; and transmit the updated ranked list of in-content challenges.

13. The non-transitory computer readable storage medium of claim 9, further comprising stored instructions to receive data on performance of an in-content challenge being met by the participant across a plurality of sessions of the online game, and further comprising stored instructions that when executed cause the computer processor to:

store action scores based on actions performed by the participant during one or more sessions; and load the action scores determined based on the actions performed by the participant during the one or more sessions for a subsequent session.

14. The non-transitory computer readable storage medium of claim 9, further comprising stored instructions that when executed cause the computer processor to receive information that an in-content challenge is being met by performance actions by the participant across a plurality of online games, wherein the online game is a first online game, and further comprising stored instructions that when executed cause the computer processor to:

store action scores based on actions performed by the participant during a session for the first online game; and load the action scores determined based on the actions performed by the participant during a new session for a second online game.

15. The non-transitory computer readable storage medium of claim 9, further comprising stored instructions that when executed causes the computer processor to receive information an in-content challenge is being met by actions performed by a plurality of participants.

16. The non-transitory computer readable storage medium of claim 9, wherein information indicating launching of the online game includes one or more of: memory usage, CPU usage, software logs, internet transmissions, or hard drive operations.

17. A computer system comprising:

a computer processor; and a non-transitory computer readable storage medium storing instructions that when executed by the computer processor cause the computer processor to:

receive a plurality of in-content challenges, each in-content challenge specifying an in-content challenge criterion based on actions performed by users in interactive media applications;

receive information indicating launching of an interactive media application by a client device of a user;

execute a machine learning based model configured to receive as input, information describing user actions performed by a particular user in a particular online game and predict a likelihood of the particular user meeting an in-content challenge in the particular online game;

identify one or more in-content challenges that the user is likely to meet based on predictions of the machine learning model;

initialize an action score for the user for each matching in-content challenge;

repeatedly perform following steps until an in-content challenge is met by the user:

receive event data indicating an action performed by the user within the interactive media application;

identify an in-content challenge associated with the action;

update the action score for the identified in-content challenge based on a value associated with the action;

responsive to updating the action score, determine whether the identified in-content challenge is met by the user; and responsive to user meeting at least one in-content challenge, generate a content item for the user; and transmit the generated content item to the client device of the user.

18. The computer system of claim 17, wherein an in-content challenge is met by performing actions by the user across a plurality of sessions of the interactive media application, the instructions further causing the computer processor to perform steps comprising:

store action scores based on actions performed by the user during one or more sessions; and load the action scores determined based on the actions performed by the user during the one or more sessions for a subsequent session.

19. The computer system of claim 17, wherein an in-content challenge is met by performing actions by the user across a plurality of interactive media application, wherein the interactive media application is a first interactive media application, the instructions further causing the computer processor to:

store action scores based on actions performed by the user during a session for the first interactive media application; and load the action scores determined based on the actions performed by the user during a new session for a second interactive media application.

20. The computer system of claim 17, wherein an in-content challenge is met by actions performed by a plurality of users.

* * * * *

UNITED STATES PATENT AND TRADEMARK OFFICE
CERTIFICATE OF CORRECTION

| | |
|---|---|
| PATENT NO. | : 11,645,560 B2 |
| APPLICATION NO. | : 17/198187 |
| DATED | : May 9, 2023 |
| INVENTOR(S) | : Matthew Dalton Pierce and Jon Alexander Peachey |

It is certified that error appears in the above-identified patent and that said Letters Patent is hereby corrected as shown below:

In the Claims

Column 38, Line 10, replace "ranking" with --rank--.
Column 38, Line 13, replace "transmitting" with --transmit--.

Signed and Sealed this
Twentieth Day of August, 2024

Katherine Kelly Vidal
Director of the United States Patent and Trademark Office